United States Patent
Nuno et al.

(10) Patent No.: US 7,455,465 B2
(45) Date of Patent: Nov. 25, 2008

(54) OPTICAL SYSTEM APPARATUS, CAMERA AND PORTABLE INFORMATION TERMINAL APPARATUS

(75) Inventors: Katsuhiko Nuno, Yokosuka (JP); Tohru Yamano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 504 days.

(21) Appl. No.: 11/188,872

(22) Filed: Jul. 26, 2005

(65) Prior Publication Data

US 2006/0018654 A1   Jan. 26, 2006

(30) Foreign Application Priority Data

Jul. 26, 2004   (JP)   ............... 2004-217932
Dec. 1, 2004   (JP)   ............... 2004-348005

(51) Int. Cl.
G03B 5/02   (2006.01)
G02B 15/14   (2006.01)

(52) U.S. Cl. ........................ 396/349; 359/704

(58) Field of Classification Search ................ 396/348, 396/349, 448; 359/676, 394, 699, 703, 704, 359/813, 821; 348/335, 373, 374
See application file for complete search history.

(56) References Cited

U.S. PATENT DOCUMENTS 5,950,028 A * 9/1999 Ito ............................... 396/349
6,926,453 B2 * 8/2005 Hisamatsu .................. 396/349

FOREIGN PATENT DOCUMENTS

| JP | 06-308592 | 11/1994 |
|----|-----------|---------|
| JP | 11-064927 | 3/1999 |
| JP | H11-129311 A | 5/1999 |
| JP | 2003-310806 | 11/2000 |
| JP | 2001-91993 A | 4/2001 |
| JP | 2001-228507 A | 8/2001 |
| JP | 2001-290196 A | 10/2001 |
| JP | 2003-149723 A | 5/2003 |
| JP | 2003-280067 | 10/2003 |
| JP | 2003-298709 | 10/2003 |
| JP | 2003-315861 A | 11/2003 |
| JP | 2004-252154 | 9/2004 |

OTHER PUBLICATIONS

U.S. Appl. No. 11/567,458, filed Dec. 6, 2006, Nuno.

* cited by examiner

*Primary Examiner*—Rodney E Fuller
(74) *Attorney, Agent, or Firm*—Oblon, Spivak, McClelland, Maier & Neustadt, P.C.

(57) ABSTRACT

An optical system apparatus having a lens barrel, including multiple lenses, that is shifted between a stored position in which the lenses are collapsed and a photographing position in which the lenses are aligned along an optical axis of the apparatus. A lens barrier covers at least a front side of a lens. A barrier driving unit moves the lens barrier between a closed position and an opened position for retracting the lens barrier out of an operation space of the lens barrel. A barrier control member prevents the lens barrier from moving to the closed position from the opened position when the lens barrel is in the photographing position.

25 Claims, 21 Drawing Sheets

OPTICAL SYSTEM APPARATUS, CAMERA AND PORTABLE INFORMATION TERMINAL APPARATUS

CROSS-REFERENCE TO RELATED APPLICATIONS

The present application claims the claims the benefit of priority to Japanese Patent Application No. 2004-217932, filed on Jul. 26, 2004, and Japanese Patent Application No. 2004-348005, filed on Dec. 1, 2004. In addition, the present application is related to the U.S. patent application entitled "Lens Barrel, Camera and Mobile Information Terminal", which claims the benefit of priority to each of Japanese Patent Application 2004-217539, filed on Jul. 26, 2004; Japanese Patent Application 2005-044909, filed on Feb. 22, 2005; and Japanese Patent Application 2005-127226, filed on Apr. 25, 2005. In addition, the present application is related to the U.S. patent application entitled "Lens Barrel, Camera and Portable Information Terminal Device", which claims the benefit of priority to Japanese patent application No. 2004-217924, filed on Jul. 26, 2004. In addition, the present application is related to the U.S. patent application entitled "Lens Barrel, Camera and Portable Information Terminal", which claims the benefit of priority to Japanese Patent Application No. 2004-217927, filed on Jul. 26, 2004. The contents of each of the above-identified applications are incorporated herein by reference.

BACKGROUND OF THE INVENTION

1. Field of the Invention

The present invention relates to a lens barrel which collapses and stores lens groups therein when not in use, and protrudes the lens groups to predetermined positions when photographing. More particularly, the present invention relates to an optical system apparatus, a camera and a portable information terminal apparatus including a lens barrel suitable for a zoom lens unit which can change the focal distance by relatively moving a plurality of lens groups.

2. Discussion of the Background

With improvement in high performance of a photographing lens such as a zoom lens unit which is capable of changing the focal distance and in downsizing according to the user's demand as to an image pickup apparatus such as a digital camera, there is an increasing number of image pickup apparatus employing a so-called collapsing photographing lens unit in which lens cylinders are stored within a body of the image pickup apparatus when photographing is not carried out. Furthermore, since not only a simple reduction in dimensions but also a further reduction in a thickness of the image pickup apparatus are also demanded, it is now desired to reduce the thickness of a lens barrel portion in a collapsed state to a minimum limit.

As a technology to cope with the demand for reduction in the thickness of the image pickup apparatus, a collapsible construction has been used, in which the lens cylinders are stored into the body of the image pickup apparatus when the photographing is not carried out and in which a part of the lenses is evacuated from an optical axis of the lenses used in photographing, when the lens cylinders are collapsed and stored. Such a technology is disclosed, for example, in JP-A 2003-315861 and in JP-A 2003-149723. According to the structures disclosed in these Japanese unexamined patent application publications, since a part of the lenses is evacuated from the optical axis when the lens cylinders are stored, a dimension of the photographic lens unit in a direction of the optical axis can be reduced in the collapsed state, so that the thickness of the image pickup apparatus can be reduced.

Also, a lens barrier which can be opened or closed when the lens barrel is collapsed is incorporated in the image pickup apparatus such as in the camera utilizing the collapsing photographing lens mentioned above, to prevent dirt and dust from entering into a body of the camera, or to prevent the photographing lens or the like from being damaged. The lens barrier is classified into a lens barrel barrier and a body barrier. The lens barrel barrier is provided inside of the lens barrel and has a barrier blade. The body barrier is provided at a front of the lens barrel of the camera body and is slid or rotated to be opened and closed. The lens barrel barrier has the advantages that it occupies little space and it can easily be interlocked with the lens barrel. However, since a diameter of a lens arranged closest to a side of an object to be photographed is the largest in the photographing lens of a recent camera equipped with a wide-angle lens, the lens barrel becomes large when the lens barrel barrier is provided in the lens barrel in which the lens having the largest diameter is accommodated. For this reason, generally, many of the cameras equipped with the wide-angle lens utilize the body barrier.

The body barrier can be classified into an external barrier and an internal barrier. The external barrier is provided outside of a front cover of the camera body and is slid to be opened and closed. The internal barrier is arranged at a position inside of the front cover and the front of the lens barrel, and is slid or rotated to be opened and closed. In the external barrier, in most cases, the user slides a barrier manually to open and close the barrier, and power of the camera is turned on or off in accordance with the sliding operation of the barrier. On the other hand, the internal barrier can also be classified into a type having a barrier lever for opening and closing a barrier in which when the user manipulates the barrier lever, the barrier being opened or closed by an operation of a link mechanism coupled to the barrier lever and the power is also turned on or off correspondingly (hereinafter, referred to as "manual open-close barrier"), and a type having a main switch in which when the user presses the main switch down, the power is turned on or off and the barrier also opens or closes automatically at the same time (hereinafter, referred to as "automatic open-close barrier").

Since it is necessary to make the opening and closing operations smooth in the body barrier, a space is provided between the front cover of the camera body and the body barrier. However, it is often the case that a rattling movement or an abnormal sound is produced when the user shakes the camera at the time that the camera is carried for example and is not used, due to the presence of the space. Accordingly, there is a camera having the external barrier in which a protrusion formed on a back surface of the external barrier mutually engages with a protrusion formed on the front cover of the camera body, only at the time when the external barrier is located at a closed position or at an evacuated position, so as to prevent the vertical rattling movement between the front cover and the external barrier. Such a technology is disclosed for example in JP-A 2001-228507.

Also, there is a camera having the external barrier with a curvature of a guide rail attached on a surface of an external package (front cover) of the camera body by which the external barrier slides and moves that curvature is made larger than a curvature of the external package of the camera body. Hence, according to this technology, the external barrier receives a force that pulls the external barrier toward a side of the camera body at the opening and closing ends of the external barrier, thereby preventing the external barrier from being rattled. Such a technology is for example disclosed in JP-A 2001-290196.

On the other hand, there is a camera having the automatic open-close barrier in which a detector for detecting that the user's finger touches the body barrier. When the detector detects that the finger of the user touches the body barrier at the time when the body barrier moves, the body barrier is moved to an opened position or the movement of the body barrier is stopped. Hence, a barrier mechanism and the lens barrel are prevented from being damaged, and simultaneously, the user's finger is also prevented from being caught by the barrier before it happens. Such a technology is disclosed in JP-A 2001-91993 for example.

However, in the structures disclosed in JP-A 2003-315861 and JP-A 2003-149723, the position of the lens evacuated from the optical axis is substantially within the lens cylinder which has the maximum outer diameter. Therefore, the lens cylinders contribute to a reduction in a thickness of the image pickup apparatus when the lenses are stored, but the outer diameter of the lens barrel increases. When compared with a case where the lens is not shifted from the optical axis, because the outer diameter of the lens cylinders increase, the dimensions of the lens cylinders, in particular, the dimensions of the lens cylinders as viewed in a plane orthogonal to the optical axis increase. As a result, a problem arises that the dimensions of the image pickup apparatus, in particular, the dimension as viewed from a front side of the image pickup apparatus increases.

Further, in the above structures disclosed in JP-A 2003-315861 and JP-A 2003-149723, the operations of the lens groups become complicated, inducing the lens barrier covering the front side of the lenses to easily interfere with the collapsing type lens barrel when the lens barrel shifts towards the collapsed and stored state.

Also, according to the structure disclosed in JP-A 2001-228507, there is a problem that its structure is difficult to be applied to the camera other than the manual open-close barrier type, since there is a variation in the engagement between the protrusion on the back surface of the external barrier and the protrusion on the front cover. In addition, it is necessary to separately manufacture the protrusions as components when a metal material is used for the external barrier and the front cover. Therefore, there is also a problem in JP-A 2001-228507 that a cost of the entire camera increases since the processes for manufacturing the protrusions as components and attaching each of the protrusions to the back surface of the external barrier and front of the front cover increase.

According to the structure disclosed in JP-A 2001-290196, since the front cover of the camera body and the external barrier are always attached to each other, there is a problem that it is necessary to increase a driving force of an actuator in the automatic open-close barrier type in a case where the actuator is driven by the main switch to open and close the external barrier. Thereby, a problem also arises in JP-A 2001-290196 that an operation of the camera including the external barrier tends to be uncertain and requires higher power consumption.

Furthermore, since JP-A 2001-91993 does not disclose measures for preventing the rattling movement between the front cover and the body barrier, the structure disclosed therein cannot solve the above-mentioned problems.

SUMMARY OF THE INVENTION

One aspect of the present invention, which has been made to solve the above problems, is to provide an optical system apparatus which is capable of easily reducing the dimension of a lens barrel in a direction of an optical axis when photographing is not carried out (when lenses are stored), the dimension of the lens barrel in a plane orthogonal to the optical axis, and consequently, to reduce the dimensions of an image pickup apparatus, and also to prevent a lens barrier covering a front side of the lenses from interfering with the collapsing type lens barrel when the lens barrel is collapsed to be stored and to prevent a rattling movement of the lens barrier.

Thus, according to one aspect of the present invention, there is provided an optical system apparatus, comprising: (1) a lens barrel including a plurality of lenses, wherein the lens barrel is configured to be moved between (i) a stored position in which the plurality of lenses are collapsed, and (ii) a photographing position in which the plurality of lenses are aligned along an optical axis of said apparatus and extended towards an object to be photographed; (2) a lens barrier configured to cover at least a front side of a lens of the plurality of lenses, the lens being closest to the object to be photographed when the lens barrel is at the stored position; (3) a barrier driving unit configured to move the lens barrier between a closed position and an opened position for retracting the lens barrier out of an operation space of the lens barrel; and (4) a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier.

According to another aspect of the present invention, there is provided an optical system apparatus comprising (1) a lens barrel including a plurality of lenses, wherein the lens barrel is configured to be moved between (i) a stored position in which the plurality of lenses are collapsed, and (ii) a photographing position in which the plurality of lenses are aligned along an optical axis of said apparatus and extended towards an object to be photographed; (2) a lens barrier configured to move relative to a front cover of the optical system apparatus and configured to cover at least a front side of a lens of the plurality of lens that is closest to the object when the lens barrel is at the stored position; and (3) a barrier driving unit configured to move the lens barrier relative to the front cover, between a closed position and an opened position for retracting the lens barrier out of an operation space of the lens barrel. Further, at least a portion of the plurality of lenses is extended toward the object in the photographing position; and a front surface of the lens barrel contacts a back surface of the lens barrier in the stored position of the lens barrel such that said lens barrier is prevented from moving along said optical axis.

According to yet another aspect of the present invention, a camera is provided with the optical system discussed above.

According to another aspect of the present invention, a portable information terminal apparatus is provided with the optical system discussed above.

BRIEF DESCRIPTION OF THE DRAWINGS

The accompanying drawings are included to provide a further understanding of the various aspects of the invention, and are incorporated in and constitute a part of this specification. The drawings illustrate embodiments of the invention and, together with the description, serve to explain the principles of the invention.

FIG. 17A shows a state in which a photographing lens is collapsed and stored in a body of the camera, and FIG. 17B shows a state in which the photographing lens is protruded from the camera body.

DESCRIPTION OF THE PREFERRED EMBODIMENTS

Figure 1:
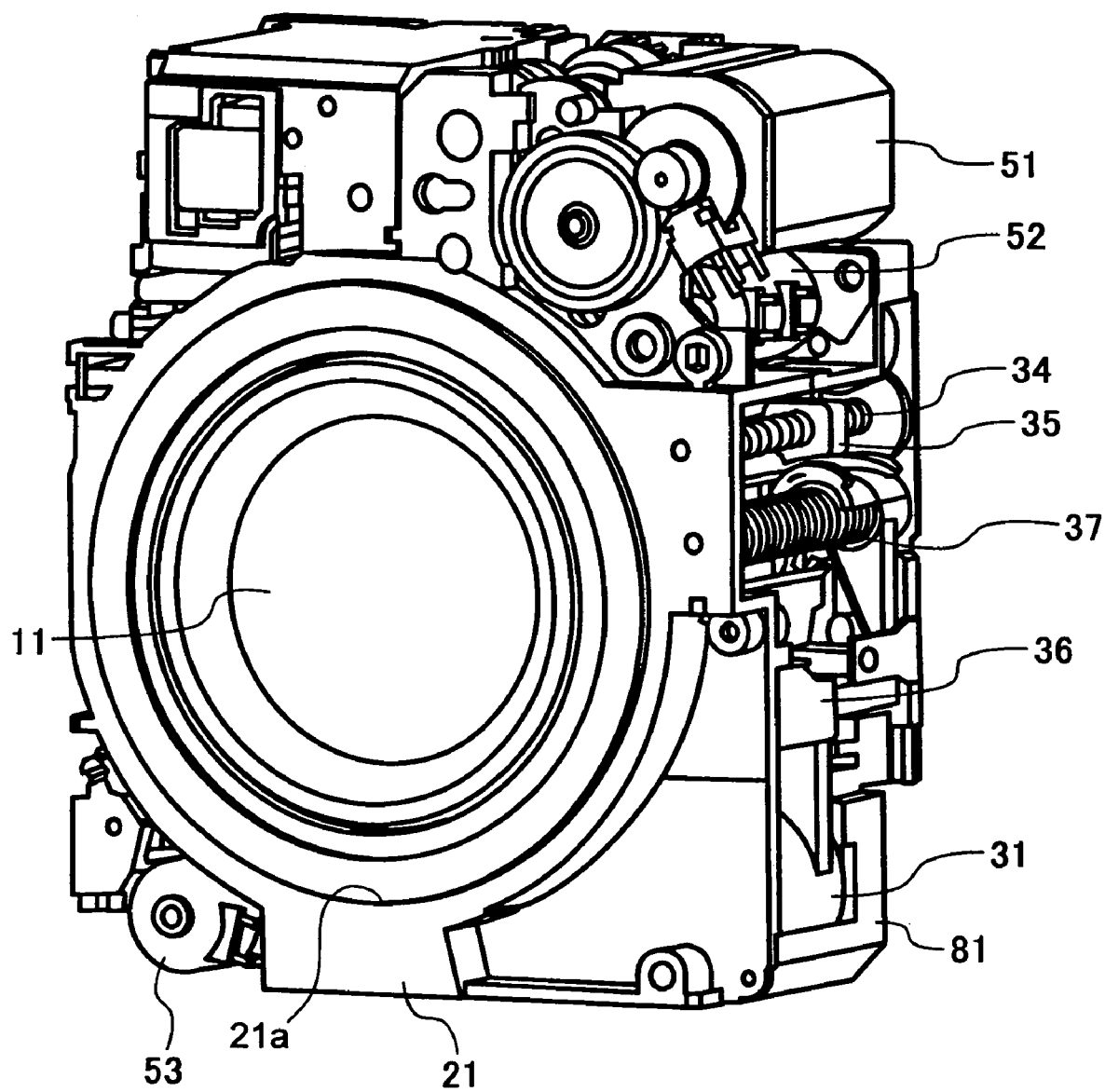
FIG. 1 is a perspective view of a structure of a portion of a lens barrel in a collapsed and stored state in which lens groups of an optical system apparatus including a lens barrel according to a first embodiment of the present invention are collapsed and stored, as view from a side of an object.

Reference will now be made in detail to the embodiments of the invention, examples of which are illustrated in the accompanying drawings. Wherever possible, the same reference numbers are used in the drawings and the description to refer to the same or like parts. The present invention, however, is not limited to these embodiments. Within the scope of the present invention, any structure and material described below can be appropriately modified.

First Embodiment

FIG. 1 to FIG. 16 show structures of portions of an optical system apparatus including a lens barrel according to a first embodiment of the present invention, and various operating states thereof.

Figure 7:
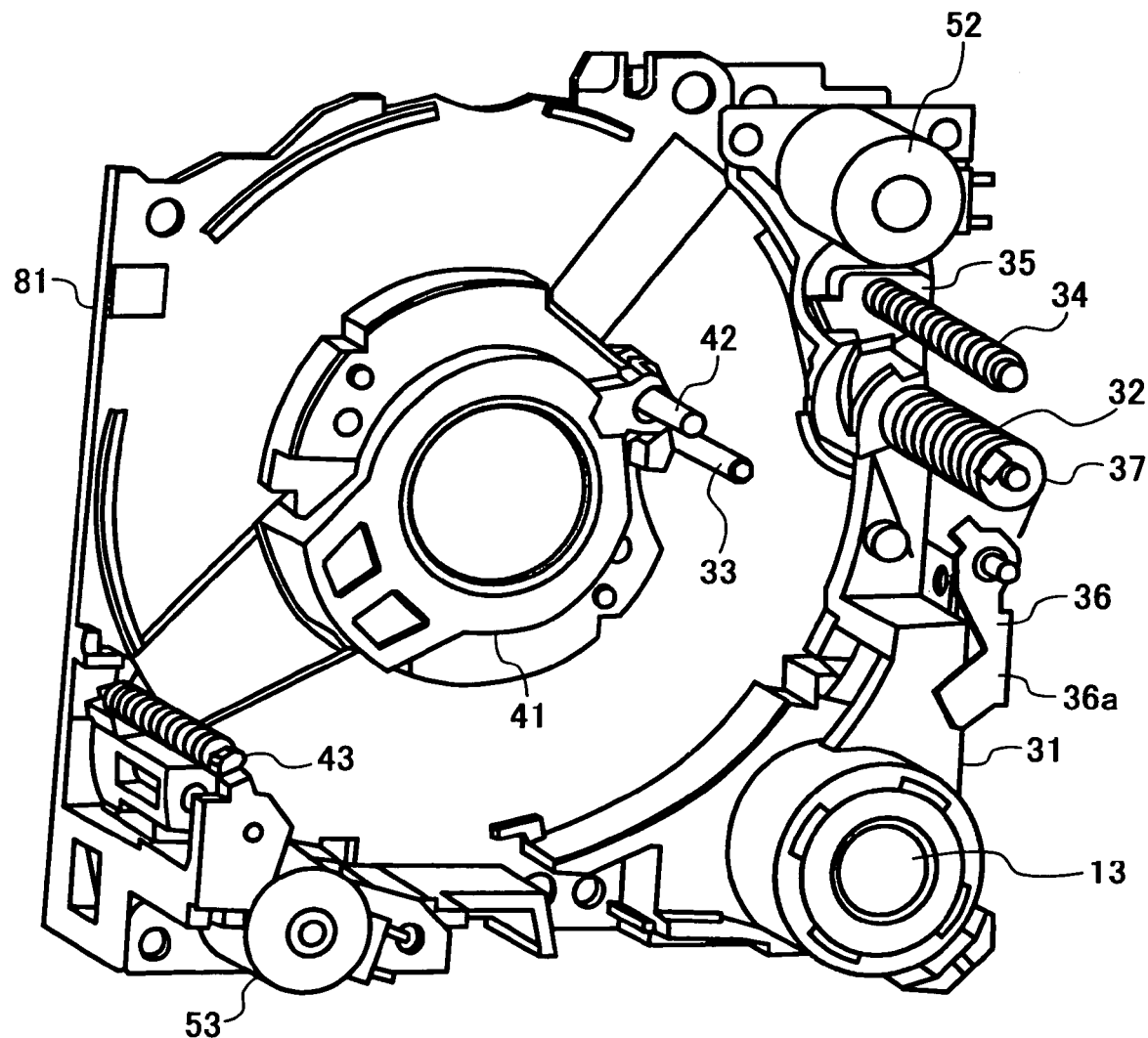
FIG. 7 is a perspective view of a layout of a third lens group frame, an impact preventing member, and a fourth lens group frame in a state in which the lens groups are in the collapsed and stored state, as viewed from the object side.
Figure 8:
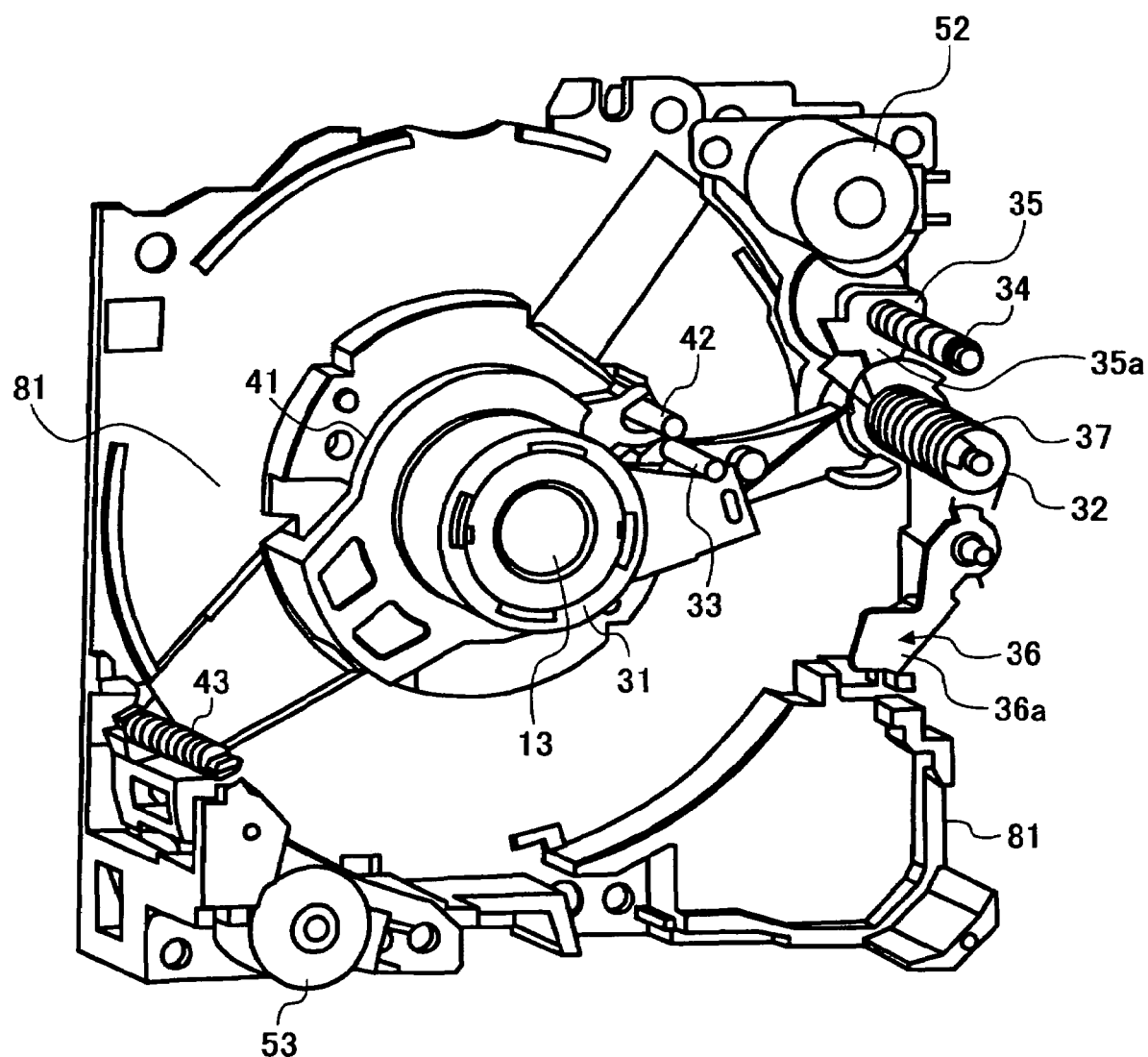
FIG. 8 is a perspective view of a layout of the third lens group frame, the impact preventing member, and the fourth lens group frame for explaining operations of the third lens group frame, as viewed from the object side.
Figure 9:
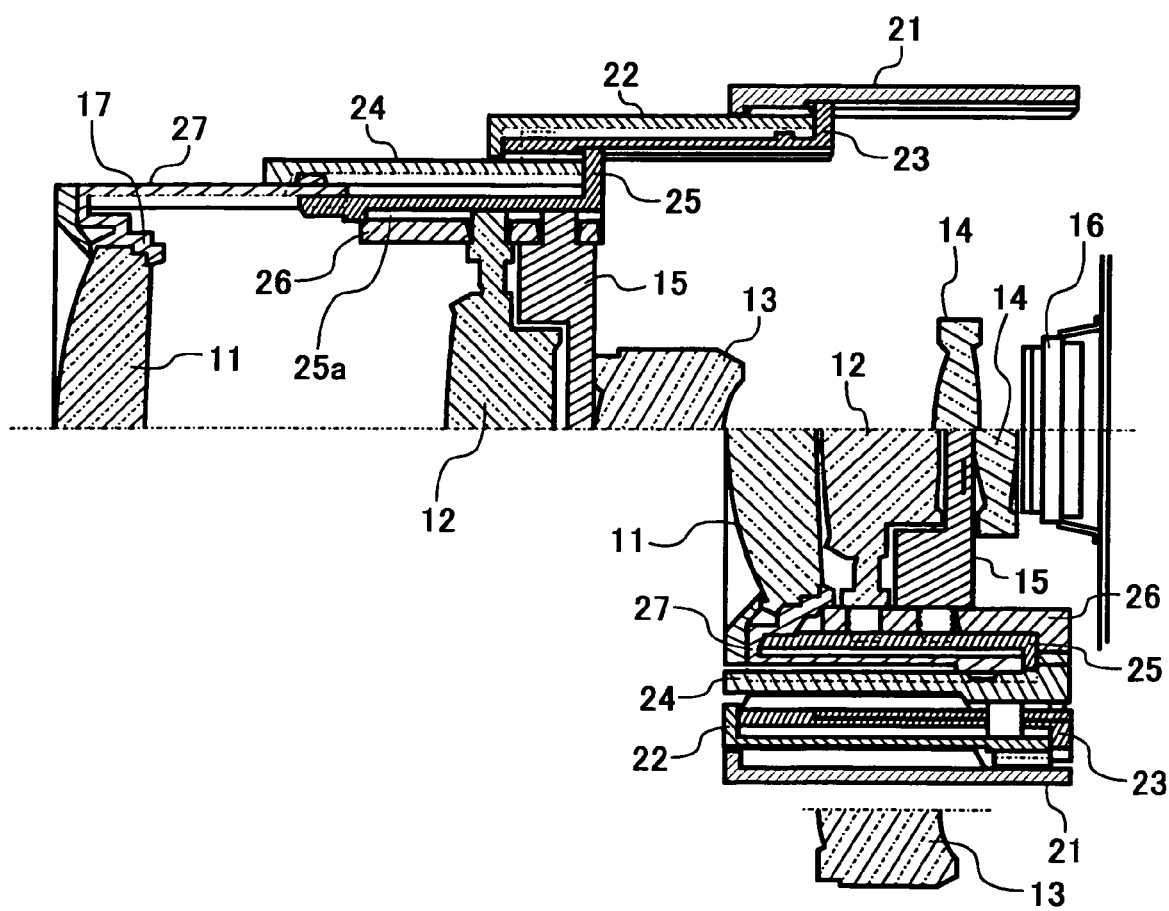
FIG. 9 is a vertical cross sectional view showing, in an upper half and a lower half with respect to an optical axis, portions of the lens groups, the lens group-retaining frames, and the lens cylinders of the lens barrel in the photographing state in which the lens groups are protruded, and in the collapsed and stored state in which the lens groups are collapsed to be stored, respectively.

As shown in FIG. 9, the optical system apparatus including the lens barrel according to the first embodiment of present invention includes a first lens group 11, a second lens group 12, a third lens group 13, a fourth lens group 14, a shutter/aperture unit 15, a solid-state image pickup device 16, a fixed frame 21, a fixed cylinder 21a, a first rotary cylinder 22, a first liner 23, a second rotary cylinder 24, a second liner 25, a cam cylinder 26, a lineally moving cylinder 27, and a third lens group frame 31. As to the third lens group 31, as shown in FIG. 2, FIG. 7, FIG. 8, and FIGS. 14 to 16, the optical system further includes a third lens group-main guide shaft 32, a third lens group-sub-guide shaft 33, a third lens group-lead screw 34, a female screw member 35, an impact preventing member 36, a compression torsion spring 37, and a photo interrupter (sensor) 38. As to the fourth lens group 14, as shown in FIG. 7, the optical system further includes a fourth lens group frame 41, a fourth lens group-guide shaft 42, and a fourth lens group-lead screw 43.

In addition, as shown in FIG. 1, the optical system includes as lens group-retaining frame drivers: a zoom motor 51, a third lens group motor 52, and a fourth lens group motor 53. Moreover, as shown in FIG. 3 to FIG. 6, FIG. 14 and FIG. 15, the optical system includes a barrier control member 61, a lens barrier 62, a barrier drive system (barrier driving unit) 63, gears 71, 72, 73, and 74, and a holding plate 81.

In this embodiment, the fixed cylinder 21a, the first rotary cylinder 22, the second rotary cylinder 24 and the lineally moving cylinder 27 form a telescopic cylinder. However, the telescope cylinder may exclude the fixed cylinder 21a. In this embodiment, the third lens group 13 is configured to be an evacuatable (retractable) lens group, and the lens group-retaining frame 31 for this third evacuatable lens group is configured to be an evacuatable frame. In this embodiment, the first rotary cylinder 22 is the cylinder most adjacent to the object side of the evacuatable lens group 13.

In the photographing state, the first lens group 11, the second lens group 12, the third lens group 13, and the fourth lens group 14 are disposed in this sequence from the object side and are coaxially located along an identical optical axis. The shutter/aperture unit 15 is interposed between the second lens group 12 and the third lens group 13. The solid-state image pickup device 16, can be for example but is not limited to, a CCD (Charge Coupled Device) or the like. The solid-state image pickup device 16 is disposed on the side of the image forming plane of the fourth lens group 14. The first lens group 11 to the fourth lens group 14 constitute a focal distance-variable zoom lens unit. The first lens group 11 includes at least one lens, and is fixedly retained by the lineally moving cylinder 27 via the lens retaining frame 17 which integrally retains the first lens group 11.

The second lens group 12 includes at least one lens. Cam followers, which are formed on the lens retaining frame (not shown) for integrally retaining the second lens group 12, are inserted into cam grooves for the second lens group in the ca cylinder 26 shown in FIG. 11, respectively. The cam followers are engaged with linear grooves 25a of the second liner 25, respectively. Thereby, the second lens group is supported by the cam cylinder 26 and the second liner 25. The shutter/aperture unit 15 includes a shutter and an aperture. Cam followers, which are formed integrally with the shutter/aperture unit 15, are inserted into cam grooves for the shutter/aperture of the cam cylinder 26 shown in FIG. 1, respectively. The cam followers are engaged with the linear grooves 25a in the second liner 25, respectively, so that the shutter/aperture unit 15 is supported by the cam cylinder 26 and the second liner 25.

Figure 13:
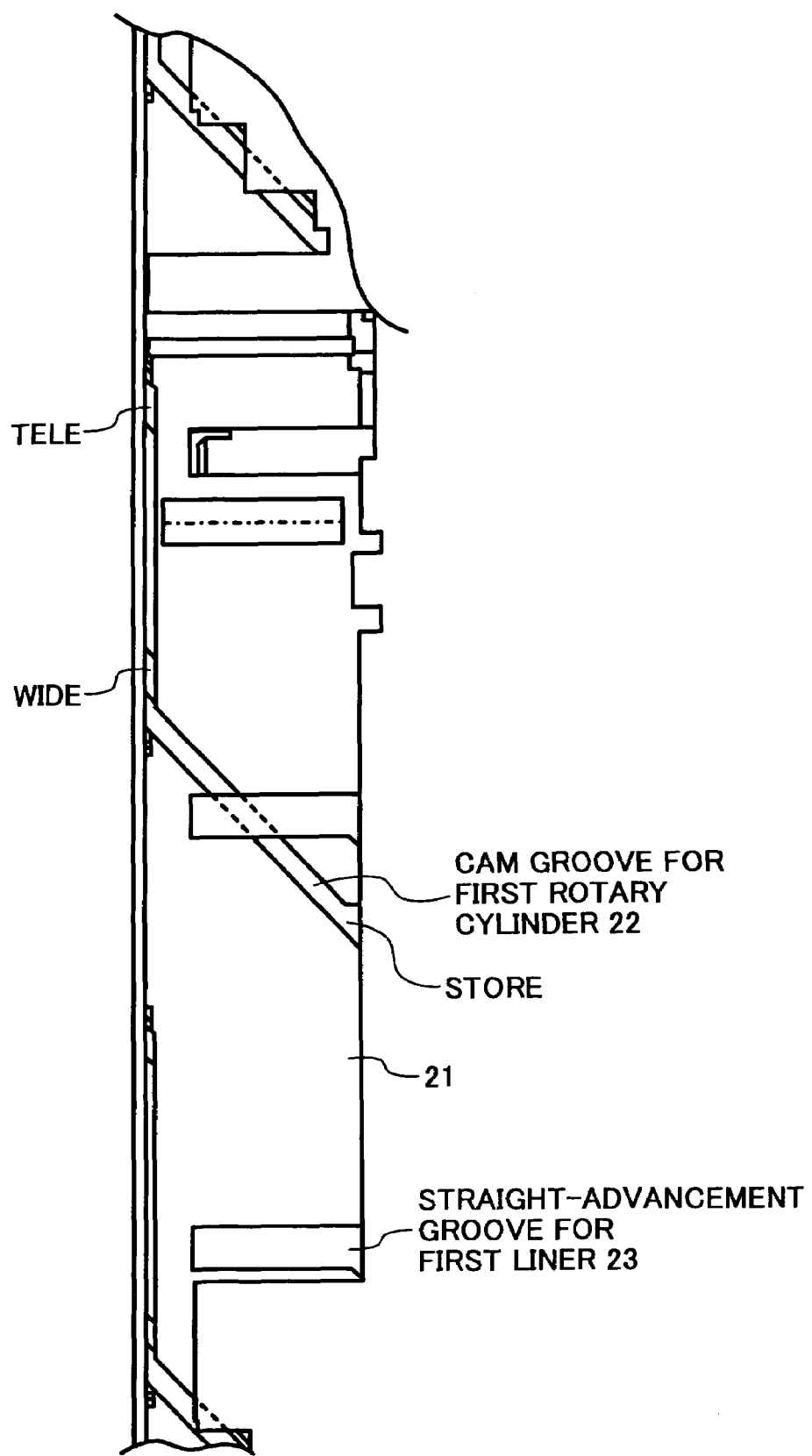
FIG. 13 is a schematic development elevation showing a shape of cam grooves and key grooves formed on a fixed frame in a developed state with the helicoid omitted.

The inner surface of the fixed cylinder 21a, as shown in FIG. 13, is formed with linear grooves along the axial direction and cam grooves. Cam followers formed on the outer peripheral surface of a base end portion of the first rotary cylinder 22 engage with the cam grooves, respectively. Key portions, which are outwardly protrusively formed on the outer surface of a base end portion of the first liner 23, engage with the linear grooves, respectively. The inner surface of the first rotary cylinder 22 is formed with guide grooves which extend in a plane orthogonal to the optical axis. The guide groove is engaged with the cam followers formed outwardly protrusively from the outer peripheral surface of the first liner 23 in the vicinity of the base end portion of the first liner 23. The inner surface of the first rotary cylinder 22 is formed with linear grooves along the axial direction. The inner surface of the first liner 23 is formed with linear grooves along the axial direction and helicoids. The first liner 23 is formed with cam grooves to which cam followers formed protrusively from the outer peripheral surface of the second rotary cylinder 24 in the vicinity of the base end portion are inserted.

Helicoids are formed in the outer surface of the base end portion of the second rotary cylinder 24, and are engaged with those of the first liner 23, respectively. The cam followers, which are formed protrusively from the outer peripheral surface of the second rotary cylinder 24 in the vicinity of the base end portion, engage with the linear grooves in the first rotary cylinder 22 through the cam grooves on the first liner 23, respectively. Key portions formed protrusively from the outer surface of the base end portion of the second liner 25 engage with the linear grooves of the first liner 23, respectively. The cam cylinder 26, which is movably fitted in the inner periphery of the second liner 25, is provided with fixing protrusions, which are formed protrusively on the outer peripheral surface of the base end portion and are fixedly fitted to the base end portion of the second rotary cylinder 24. Thereby, the cam cylinder 26 moves integrally with the second rotary cylinder 24.

A straight-advancement cam groove is formed in the inner peripheral surface of the second rotary cylinder 24, and key portions provided on the outer peripheral surface of the front end portion of the second liner 25 engages with the straight-advancement cam groove. The base end side of the lineally moving cylinder 27 is inserted between the second rotary cylinder 24 and the second liner 25. Cam followers are formed protrusively from the outer peripheral surface of the lineally moving cylinder 27 in the vicinity of the base end portion, and the cam followers engage with cam groove of the second rotary cylinder 24, respectively. A linear groove is formed in the inner peripheral surface of the lineally moving cylinder 27 along the axial direction, and a key portion formed on the outer peripheral surface of the front end portion of the second liner 25 engages with the linear groove. A gear portion is formed at the outer peripheral surface of the base end portion of the first rotary cylinder 22, so that a drive force of the zoom motor 51 is transmitted via the gears as needed, when the first lens group 11, the second lens group 12, and the shutter/aperture unit 15 are zoomed in and out in a predetermined manner.

Figure 10:
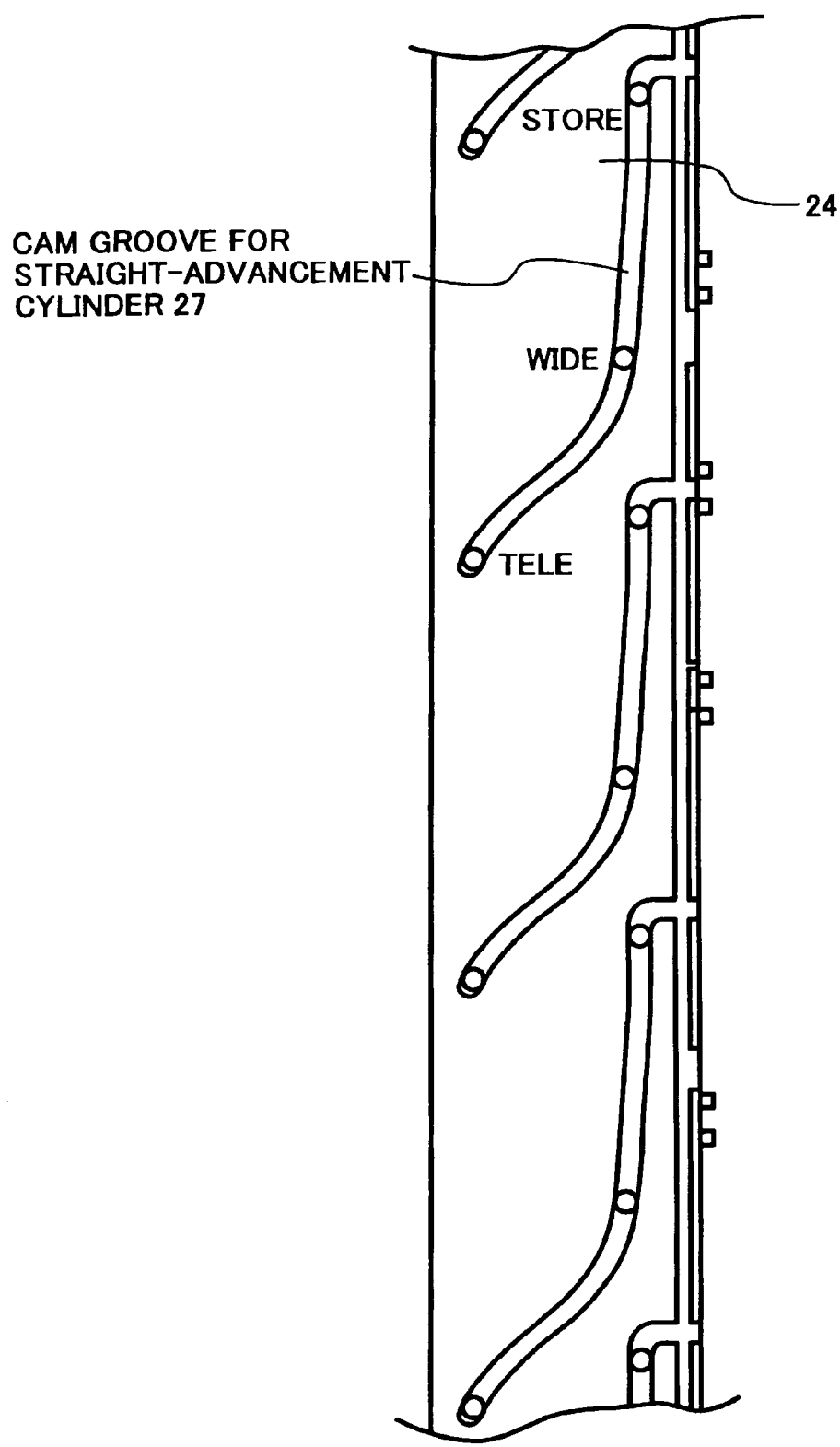
FIG. 10 is a schematic development elevation showing a shape of cam grooves formed on a second rotary cylinder.
Figure 11:
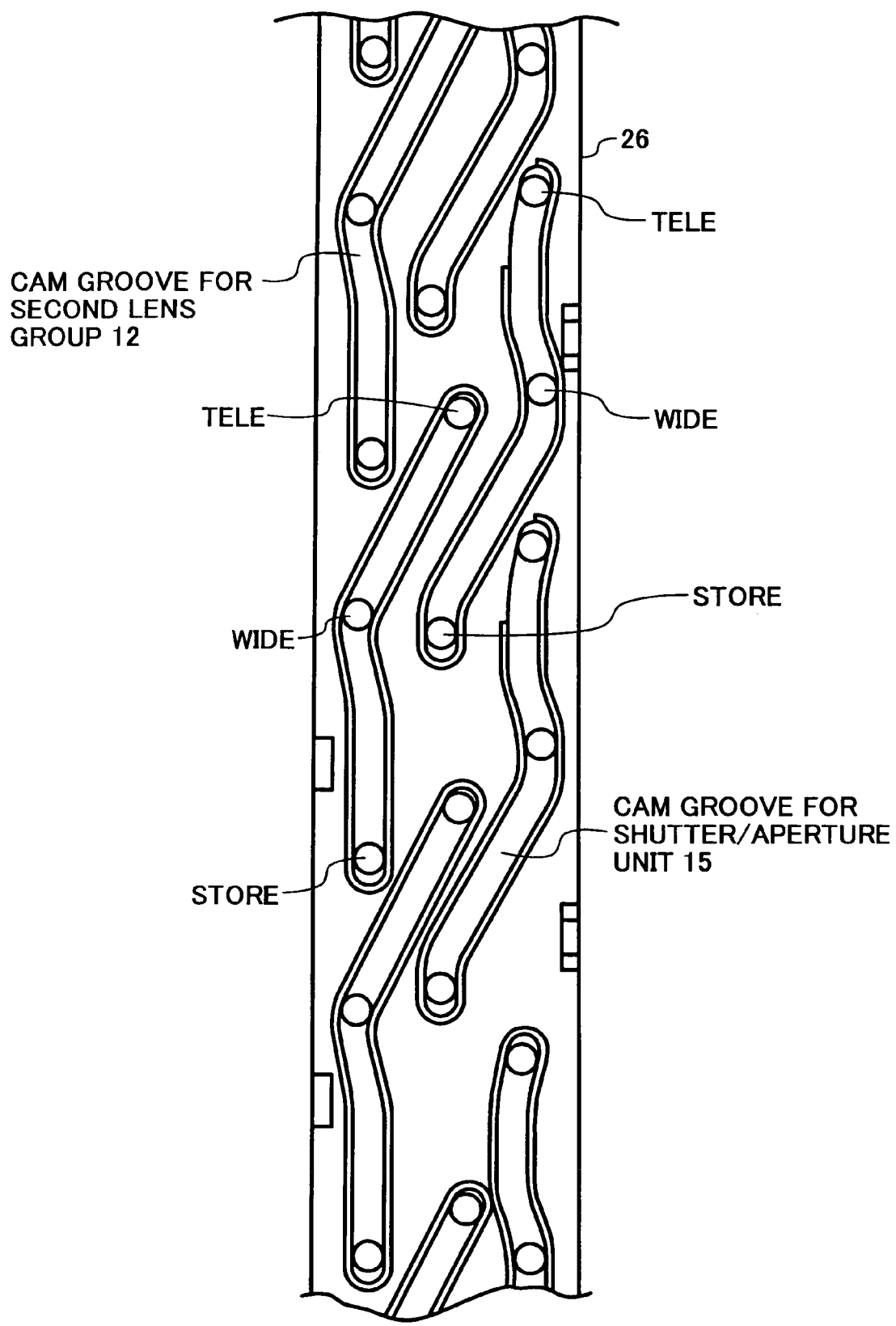
FIG. 11 is a schematic development elevation showing a shape of cam grooves formed on a cam cylinder.
Figure 12:
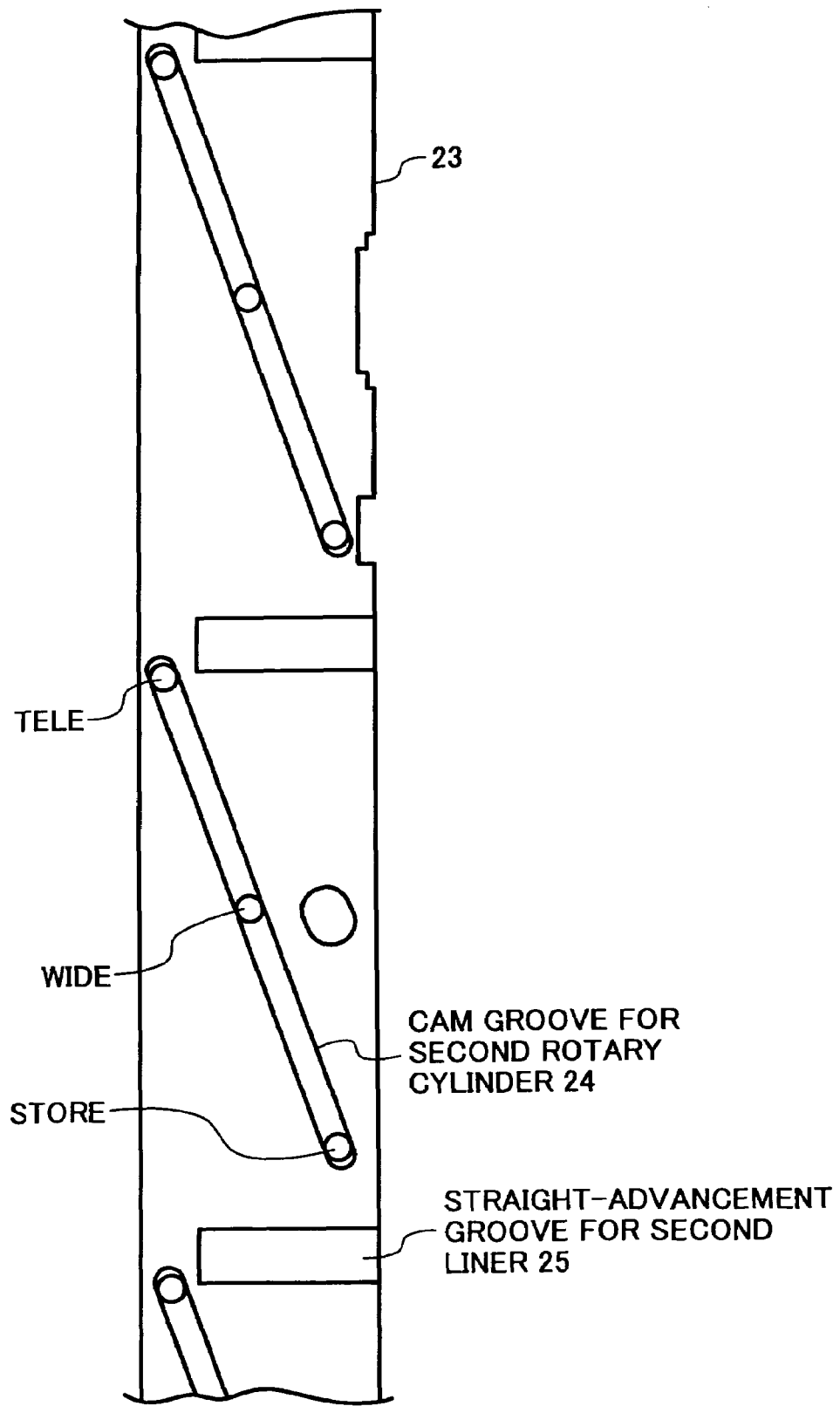
FIG. 12 is a schematic development elevation showing a shape of cam grooves and key grooves formed on a first liner with a helicoid omitted.

FIG. 10 shows the cam grooves in the second rotary cylinder 24 which engage with the cam followers on the straight-advance cylinder 27. FIG. 11 shows the cam grooves in the cam cylinder 26 which engage with the cam followers on the lens retaining frame of the second lens group 12 as well as the cam grooves of the cam cylinder 26 which engage with the cam followers of the shutter/aperture unit 15, respectively. FIG. 12 shows the cam grooves in the first liner 23 which engage with the cam followers of the second rotary cylinder 24, respectively, as well as the straight grooves in the first liner 23 which engage with the key grooves on the second liner 25, respectively. FIG. 13 shows the linear grooves in the fixed cylinder 21a which engage with the key portions of the first liner 23 of the fixed cylinder, respectively, as well as the cam grooves of the fixed cylinder 21a which engage with the cam followers of the first rotary cylinder 22, respectively.

In other words, the first rotary cylinder which is the closest to the fixed cylinder on the outermost circumference is generally screwed onto the fixed cylinder by the helicoids, and the helicoids move at a constant speed because of their shape. Therefore, the first rotary cylinder is traditionally moved out by around half at short focal length/wide angle position in the course of the gradual movement from the collapsed and stored state to the long focal length/telephoto position through the short focal length/wide angle position. In contrast, according to one embodiment of the present invention, the first rotary cylinder 22 is not simply screwed with the fixed cylinder via the helicoids, but via the cam grooves of the helicoid shape. The first rotary cylinder 22 is moved completely to the maximally extended position by being driven from the stored state to the short focal length wide angle position, and then, as shown in FIG. 13, the object side end of the cam groove lies in parallel with the end surface of the fixed cylinder portion, so that the first rotary cylinder 22 runs idle during drive from the short focal length wide angle position to the long focal length/telephoto position.

Therefore, by completely extending the first rotary cylinder 22, which is the lens cylinder at the closest portion to the fixed cylinder in an early stage of the extending action, a space for inserting the third lens group frame 31 to a position on the optical axis is secured.

Figure 2:
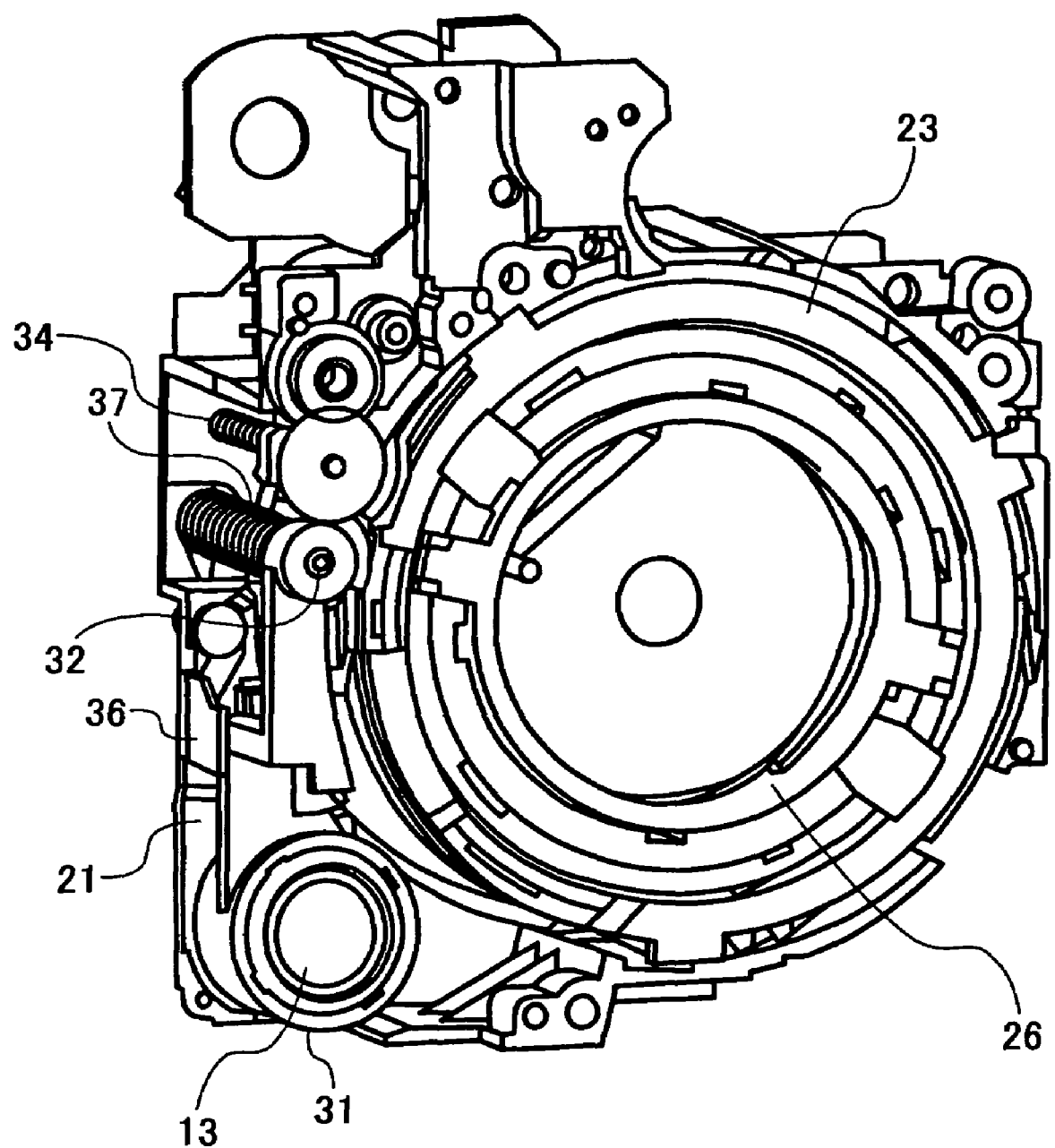
FIG. 2 is a perspective view of the portion of the apparatus shown in FIG. 1, as viewed from a side of an image forming plane.

The third lens group 13 is retained by the third lens group frame 31 serving as the lens retaining frame. The third lens group frame 31 retains the third lens group 13 at one end, and the other end of the third lens group frame 31 is rotatably supported by the third lens group-main guide shaft 32 which extends substantially in parallel with the optical axis of the third lens group 13 such that the third lens group frame may slide along the third lens group-main guide shaft 32. The third lens group frame 31 rotates about the third lens group-main guide shaft 32 between (i) the position on the optical axis in which the third lens group 13 is inserted to the position on the optical axis in the photographing state as shown in FIG. 8 and (ii) the stored position in which the third lens group 13 is evacuated from the fixed cylinder 21a in the collapsed and stored state as shown in FIG. 2, through a wall of the fixed cylinder 21a. In the vicinity of the third lens group 13 on the side of the rotating end of the third lens group frame 31, a crank-shaped bent portion for differentiating the position of the third lens group 13 between the side of the rotation axis and the side of the supporting portion in the direction parallel with the main guide shaft, and a stopper 31a and a light-shielding member 31b are formed to protrude from the bent portion substantially toward the rotating end (See FIGS. 14 and 15).

Figure 14:
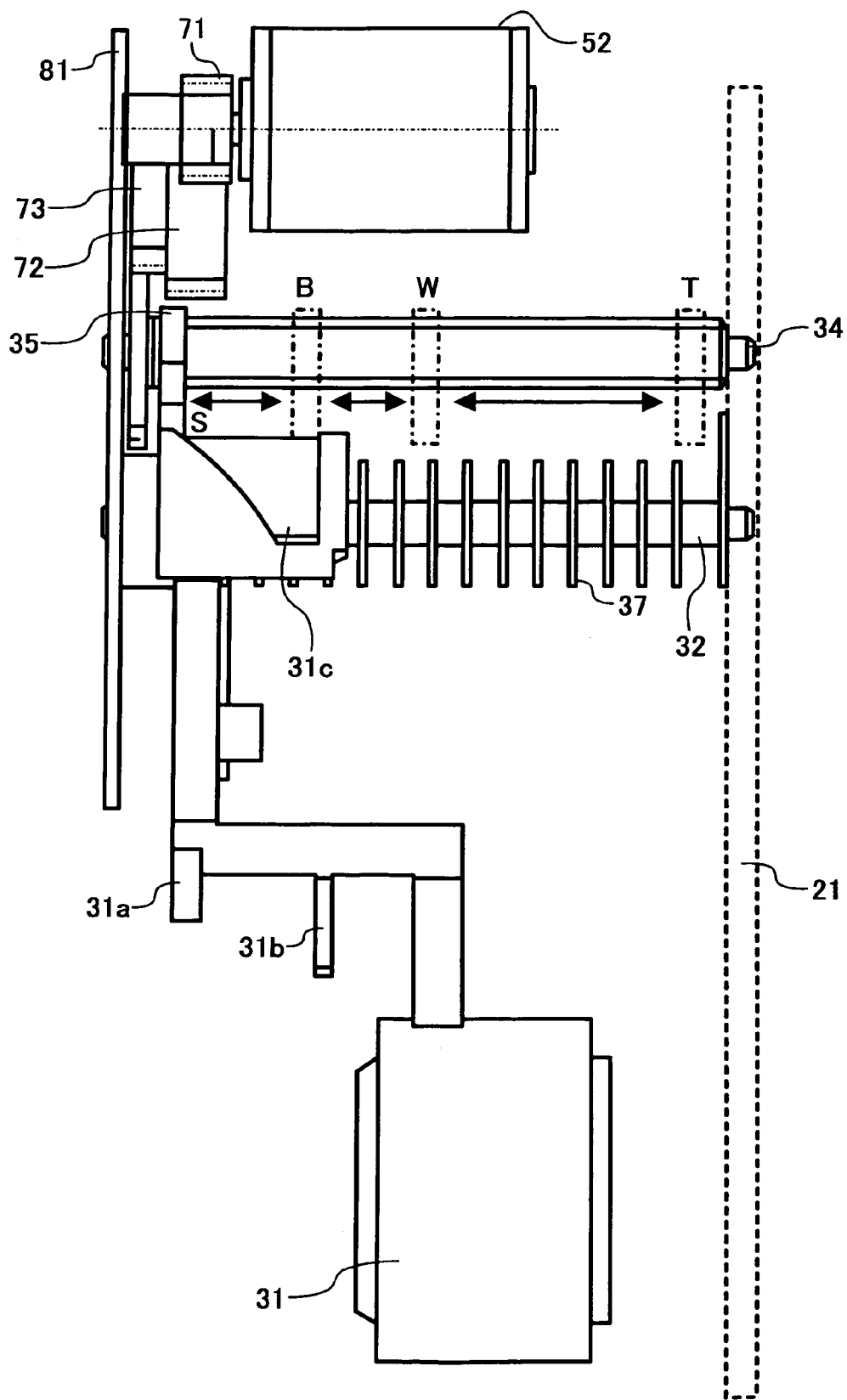
FIG. 14 is a side view showing a structure of the third lens group frame and its drive operation system.
Figure 15:
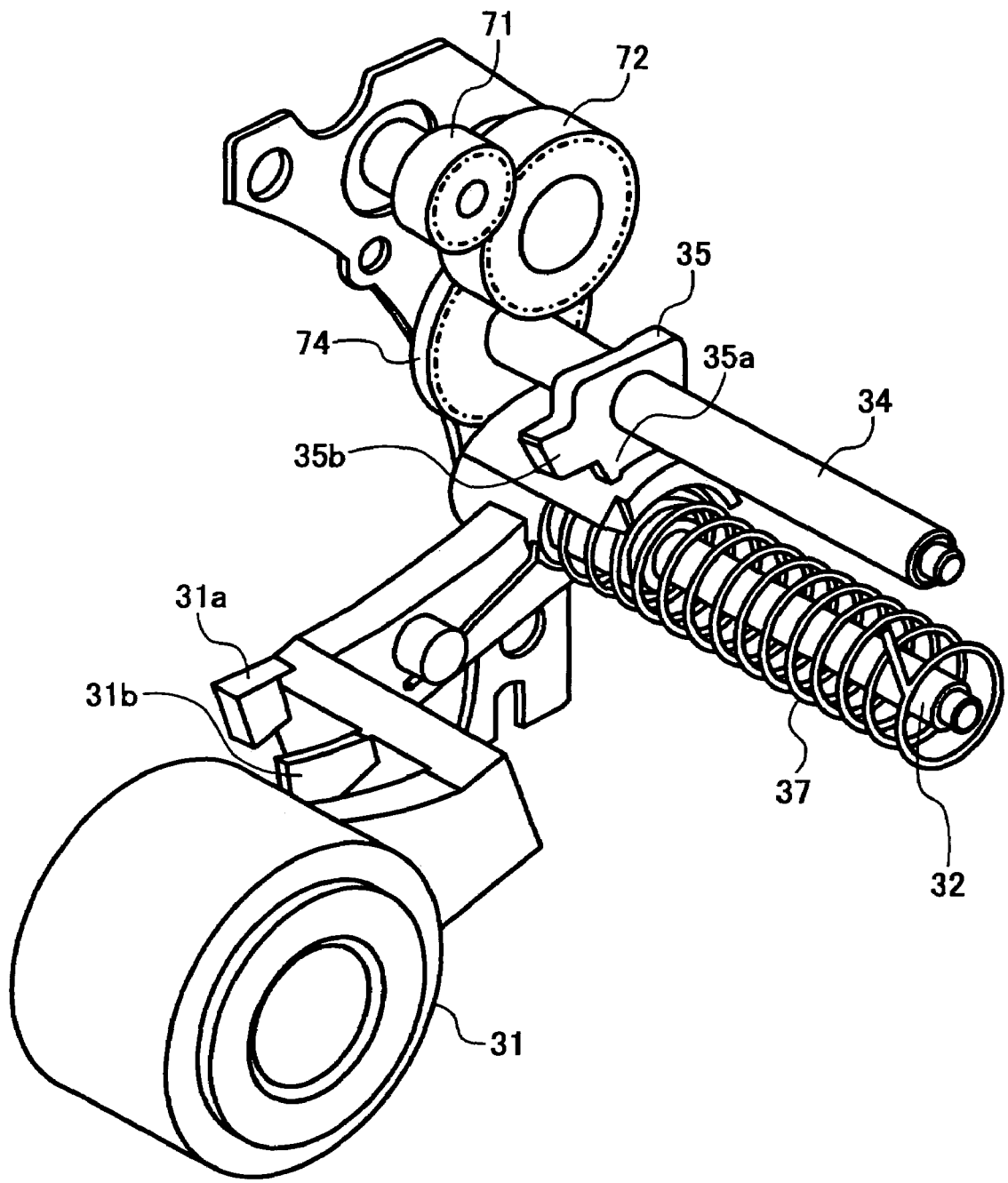
FIG. 15 is a perspective view showing the structure of the third lens group frame and its drive operation system.
Figure 16:
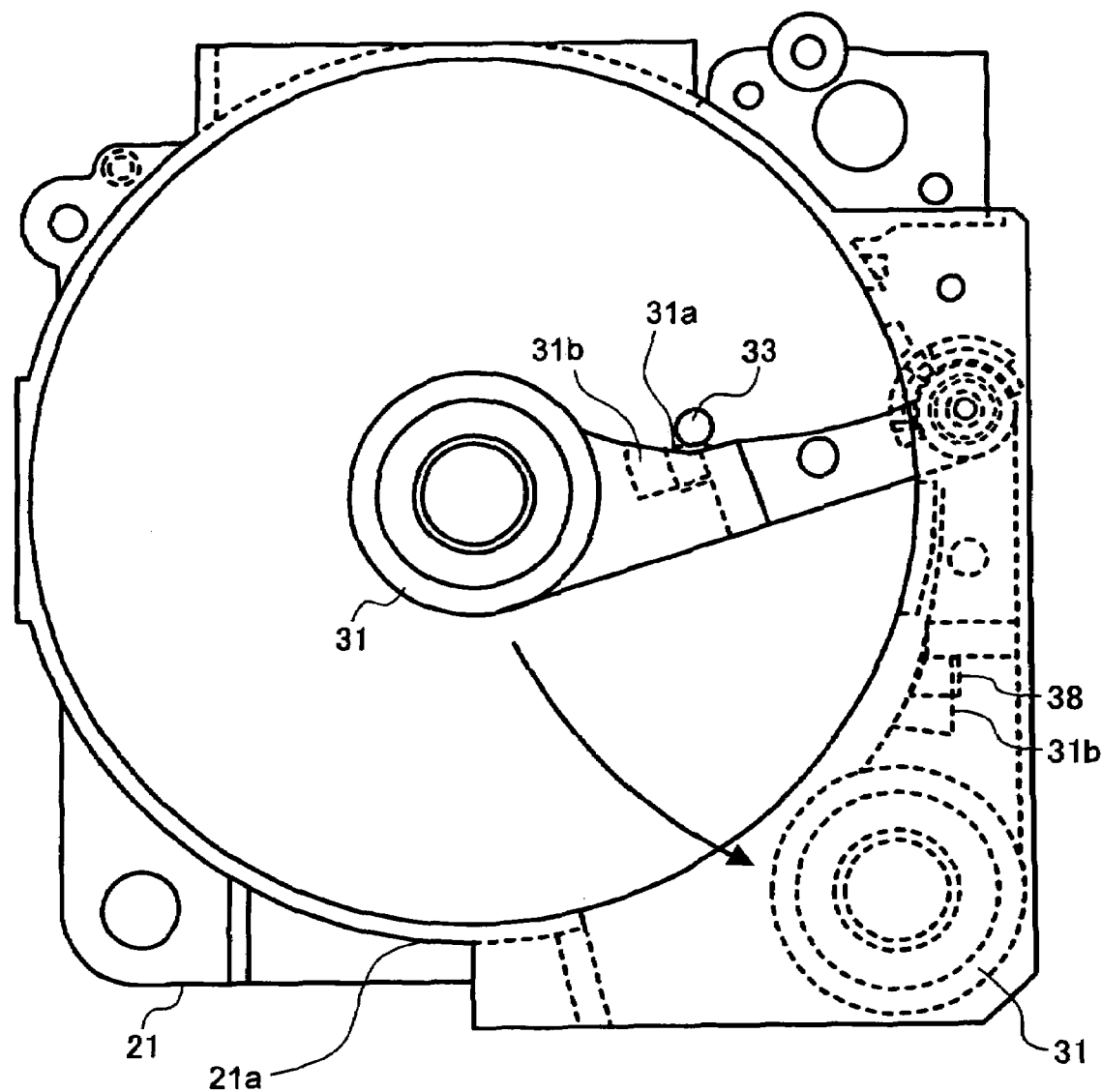
FIG. 16 is a back view of the third lens group frame portion for explaining an operation of the third lens group frame, as viewed from the side of the image forming plane.

As shown in FIG. 8 and FIG. 16, the stopper 31a defines the position of the third group frame 31 on the optical axis by coming into abutment with the third group sub-guide shaft 33, and the light shielding frame 31b is adapted to detect that the third group frame 31 is in the stored position by shielding light toward the photo interrupter 38 (a position detecting device) as shown in FIG. 16. A cam portion 31c including a shouldered portion shown in FIG. 14 is formed on the cylindrical outer circumferential surface of the portion of the third group frame 31 supported by the main guide shaft 32. The cam portion 31c is formed with a cam surface, which is an inclined surface coming into sliding contact with the sliding-contact surface of an engaging portion 35a of the female screw member 35 screwed on the third group-lead screw 34, and an abutment-engagement surface engaged with the abutment-engagement surface of the engaging portion 35a. The abutment-engagement surface of the cam portion 31c defines a flat surface intersecting substantially orthogonally with the third group main guide shaft 32, for example. The third group frame 31 is constantly biased in the rotating direction from the stored position toward the position on the optical axis, and simultaneously, is constantly biased in the direction from the object side toward the holding plate 81 on the side of the image surface along the third group main guide shaft 32 by the compression torsion spring 37 disposed around the third group main guide shaft 32.

The female screw member 35 is screwed on the third group-lead screw 34 disposed substantially in parallel with the optical axis, and is formed with a rotation-preventing protrusion 35b which is fitted into and slid along the guide groove formed on the fixed cylindrical portion of the fixed frame 21 in parallel with the optical axis as a rotation-preventing device for preventing the female screw member 35 from rotating along with the rotation of the third lead screw 34, in addition to the engaging portion 35a which engages with the above-described cam portion 31c of the third group frame 31. In other words, the female screw member 35, is prevented from rotating by the rotation-preventing protrusion 35b fitted into the guide groove on the fixed frame 21, and is moved back and forth along the optical axis by the rotation of the third lead screw 34.

As shown in FIG. 14, the female screw member 35 constantly engages with the cam portion 31c of the third group frame 31, and at a stored position S on the left side in FIG. 14, the third group frame 31 comes into contact with the holding plate 81 by being biased by the compression torsion spring 37, whereby the third group frame 31 is positioned in the stored position against the biasing force exerted by the compression torsion spring 37 in the rotating direction toward the position on the optical axis. While the female screw member 35 is moved from the stored position S to an evacuation position B by the rotation of the third group-lead screw 34, the third group frame 31 is rotated from the stored position described above to the position on the optical axis by a rotational biasing force exerted by the compression torsion spring 37 and the cam bevel of the cam portion 31c of the third group frame 31. At this time, the position of the third group frame 31 on the optical axis is correctly set on the position on the optical axis described above by the stopper 31a of the third group frame 31 coming into abutment with the third group sub-guide shaft 33 as shown in FIG. 16.

When the female screw member 35 reaches the evacuation position B, the engaging portion 35a of the female screw member 35 reaches the abutment-engagement surface of the cam portion 31c of the third group frame 31, and thereafter, the engaging portion 35a of the female screw member 35 moves the third group frame 31 toward the object against the biasing force of the compression torsion spring 37 toward the image surface by the engagement of the engaging portion 35a with the cam portion 31c, and the female screw member 35 moves the third group frame 31 until it reaches a long focal length/telephoto position T via a short focal length wide angle position W. The engaging portion 35a of the female screw member 35 engages with the cam portion 31c of the third group frame 31 on the abutment-engagement surface while the female screw member 35 is moved from the long focal length/telephoto position T to the evacuation position B via the short focal length wide angle position W by a reverse rotation of the third group-lead screw 34.

Thus, the third group frame 31 is moved gradually from the object side to the image surface side by the biasing force toward the position on the optical axis and the biasing force toward the image surface exerted by the compression torsion spring 37 while maintaining the position on the optical axis restrained by the third group sub-guide shaft 33. While the female screw member 35 moves from the evacuation position B to the stored position S, the engaging portion 35a of the female screw member 35 comes into sliding contact with the cam bevel of the cam member 31c of the third group frame 31 and rotates the third group frame 31 against the rotational biasing force exerted by the compression torsion spring 37, whereby the third group frame 31 rotates from the position on the optical axis to the stored position. When the third group frame 31 reaches the stored position, the position is detected by the photo interrupter 38, and hence the movement of the first lens group 11, the second lens group 12, and the shutter/aperture unit 15 to the collapsed and stored position is permitted.

In other words, a retraction of the first rotary cylinder 22 can be achieved safely without an interference with the third group frame 31 even at the time of a failure, if the device is configured in such a manner that the first rotary cylinder 22 is collapsed after the completion of the storage of the third group frame 31 as detected by the photo interrupter 38, or that a component located inwardly of the first rotary cylinder 22 and the first liner 23, that is, forwardly of the base end surface thereof, is collapsed from the position immediately before coming into contact with the third group frame 31 after detection. With a zoom motor 51 configured to use a general pulse motor, the positions of the first rotary cylinder 22 and the other rotary cylinders can be set by a count of the drive pulse.

The impact preventing member 36 is, as shown in particular in FIG. 2 and FIG. 7, rotatably supported by the fixed cylinder 21a in the vicinity of the third group main guide shaft 32, and is constantly biased in the direction of rotation to cause the engaging protrusion 36a in the vicinity of the rotating end to be protruded toward the position of the photographing optical axis by the spring or the like. When the third group frame 31 is positioned in the stored position, the impact preventing member 36 is pushed out by the third group frame 31 against the biasing force, and is located in a position outside of the third group frame 31 (See FIG. 2 and FIG. 7). When the third group frame 31 is rotated and positioned on the optical axis, the impact preventing member 36 is released from engagement with the third group frame 31, and is rotated in the direction to cause the engaging protrusion 36a to be protruded toward the photographing optical axis by the biasing force, thereby causing the engaging protrusion 36a to protrude from the inner surface of the fixed cylinder 21a. At this time, in addition to the first rotary cylinder 22 and the first liner 23, the second rotary cylinder 24, the second liner 25, the cam cylinder 26 and the lineally moving cylinder 27 are all positioned on the object side relative to the protruded position of the engaging protrusion 36a. Therefore, the engaging protrusion 36a protrudes toward an inside relative to the base end outer surface edges of the first rotary cylinder 22 and the first liner 23 (See FIG. 5, FIG. 6, and FIG. 8).

Therefore, when a large pressure is exerted on the distal end of the lens barrel by a drop of the lens barrel or the like in the photographing state in which the lens barrel is protruded, the engaging protrusion 36a of the impact preventing member 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally moving cylinder 27) toward the third lens group 13 is prevented, so that the third group frame 31 and the third lens group 13 are prevented from becoming damaged.

The third group-lead screw 34 is rotated by the third group motor 52 in forward and reverse directions. The rotation of the third group motor 52 is transmitted to the third group-lead screw 34 via the gear 71, the gear 72, the gear 73, and the gear 74 in sequence.

The fourth lens group 14 is, as shown in FIG. 7, retained by the fourth group frame 41 serving as the lens retaining frame, and the fourth group frame 41 is screwed on the fourth group-lead screw 43 at one end and is fitted to the fourth lens group-guide shaft 42 at the other end (See FIG. 7 and FIG. 8). The fourth group-lead screw 43 and the fourth lens group-guide shaft 42 are disposed in parallel with the photographing optical axis. The fourth lens group-guide shaft 42 also serves as a rotation-preventing detent, and the fourth group frame 41 is moved back and forth along the photographing optical axis by the rotation of the fourth group-lead screw 43.

Each of (i) the zoom motor 51 for driving the first lens group 11, the second lens group 12, and the shutter/aperture unit 15, (ii) the third group motor 52 for driving the third lens group 13, and (iii) the fourth group motor 53 for driving the fourth lens group 14 is generally configured to use a pulse motor, and for example, is driven in conjunction with each other by way of a software for achieving an appropriate zooming action performed mainly by the first to the third lens groups 11-13 and an appropriate focusing action performed mainly by the fourth lens group 14, for example.

As shown in FIG. 9, behind the fourth lens group 14, that is, on a far side from the object, the solid-state image pickup device 16 such as a CCD (Charge Coupled Device) solid-state image pickup device or the like. The device 16 is disposed so that an image of a photographic subject is formed on the input surface of the solid-state image pickup device 16. On the side of the input surface of the solid-state image pickup device 16, various optical filters, a cover glass, or the like are provided as needed.

Figure 3:
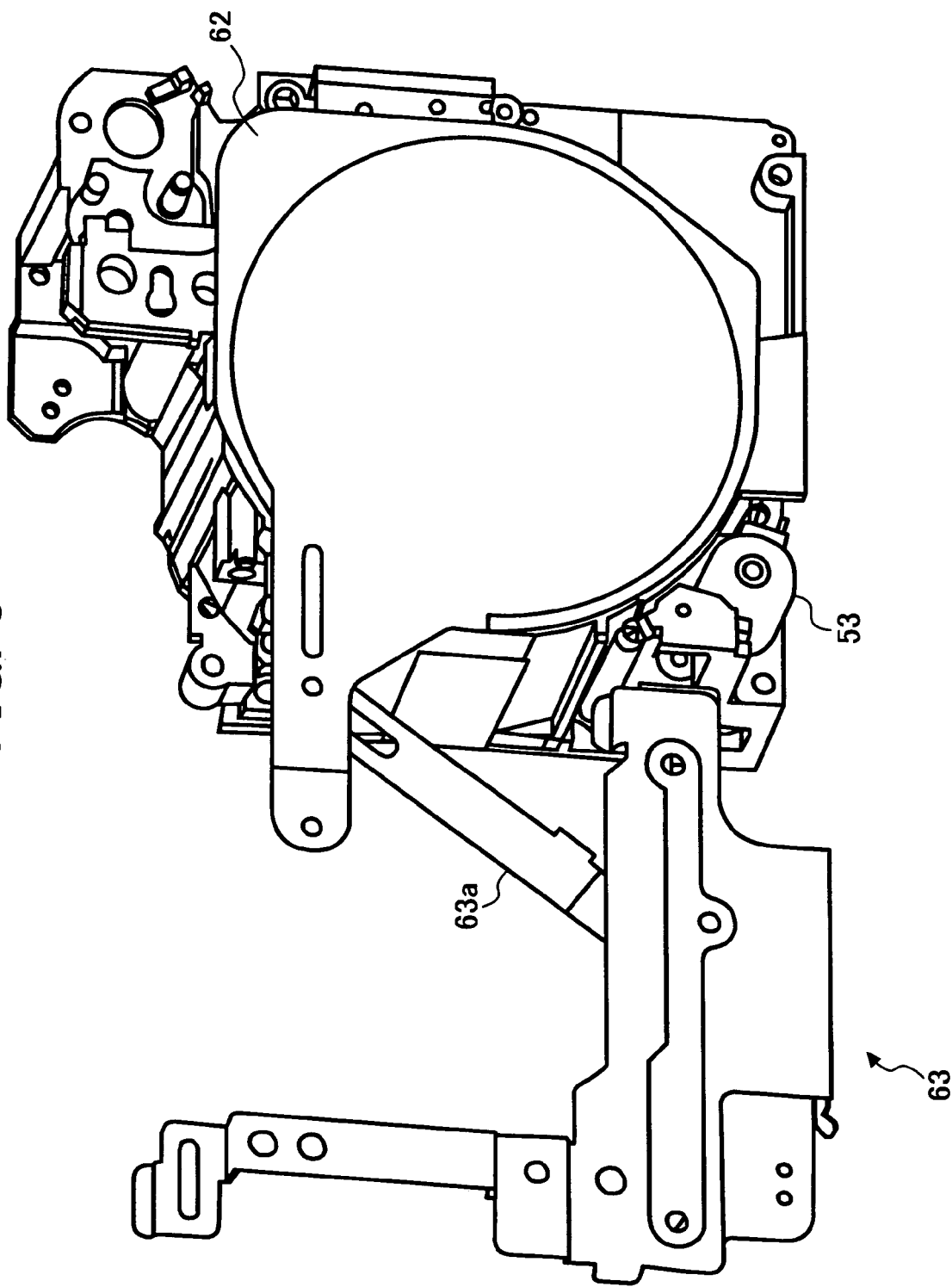
FIG. 3 is a schematic perspective view of a structure of a portion of the optical system apparatus including the lens barrel and a lens barrier in the collapsed and stored state of the lens barrel in which the lens barrier is closed, as viewed from the object side.
Figure 4:
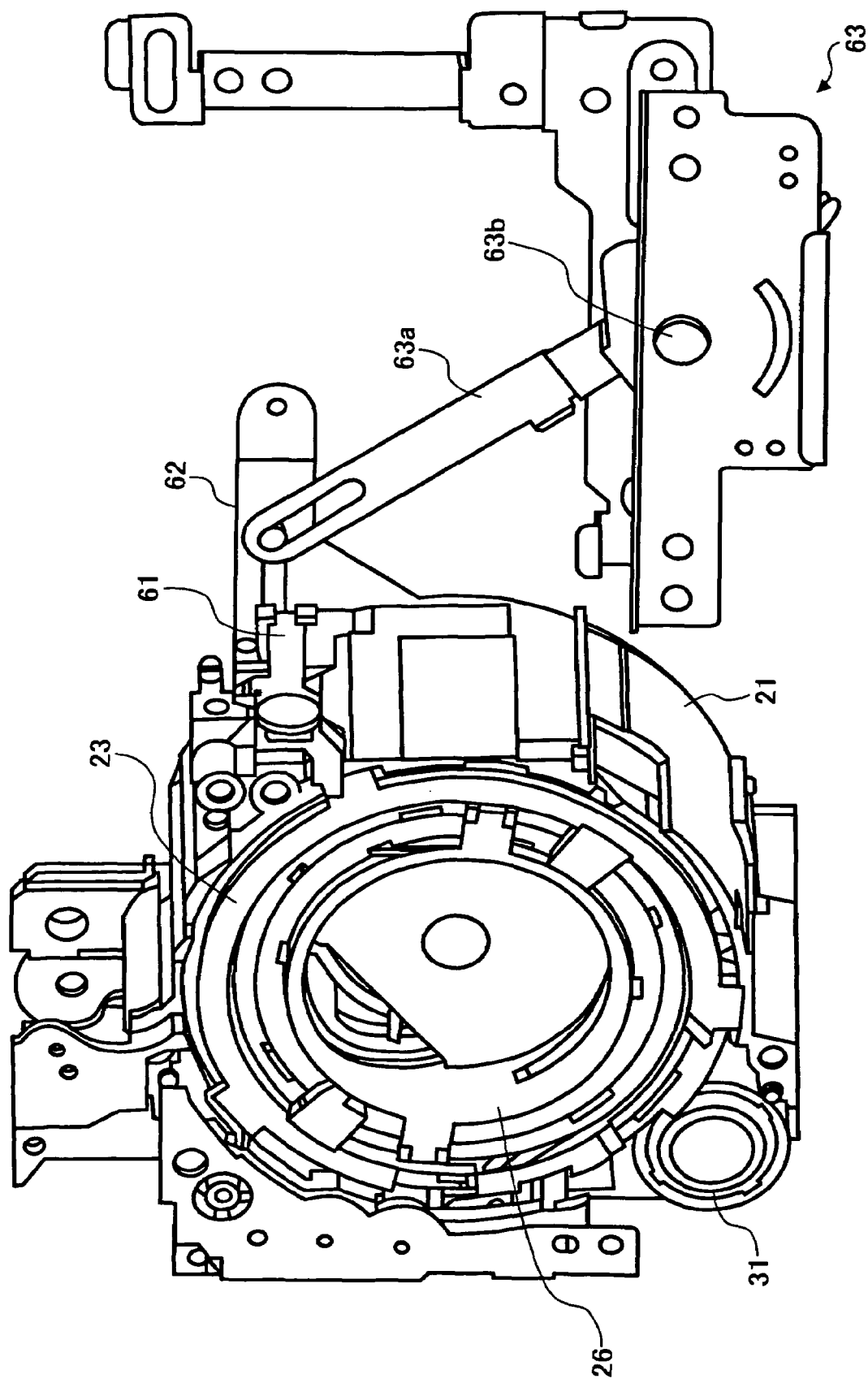
FIG. 4 is a schematic perspective view of the structure of the portion of the apparatus shown in FIG. 3, as viewed from the side of the image forming plane.
Figure 5:
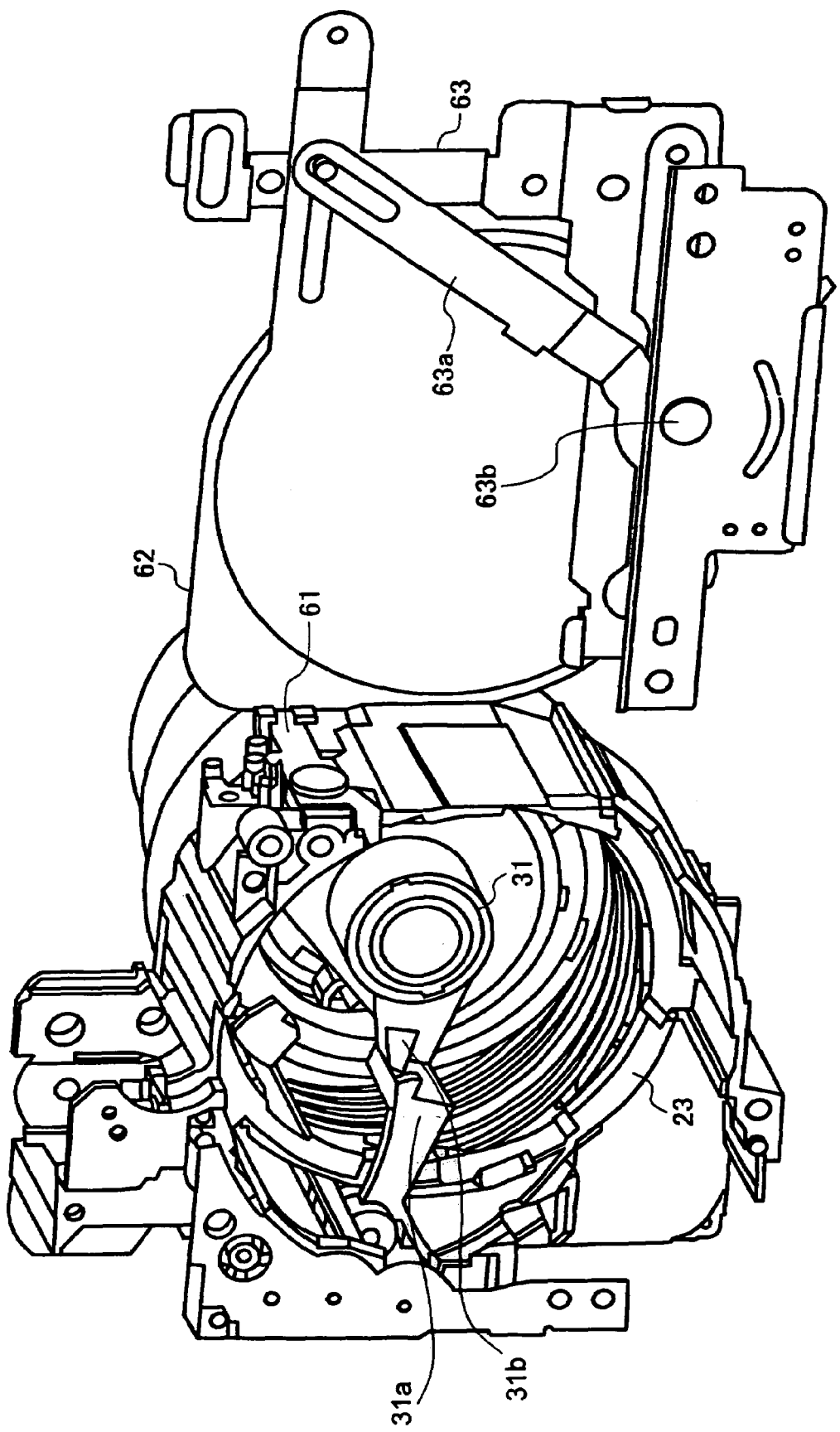
FIG. 5 is a schematic perspective view of the structure of the portion of the lens barrel and a structure of a portion of the lens barrier in a state in which an attempt is made to close the opened lens barrier in a photographing state with the lens groups protruded, as viewed from the side of the image forming plane.
Figure 6:
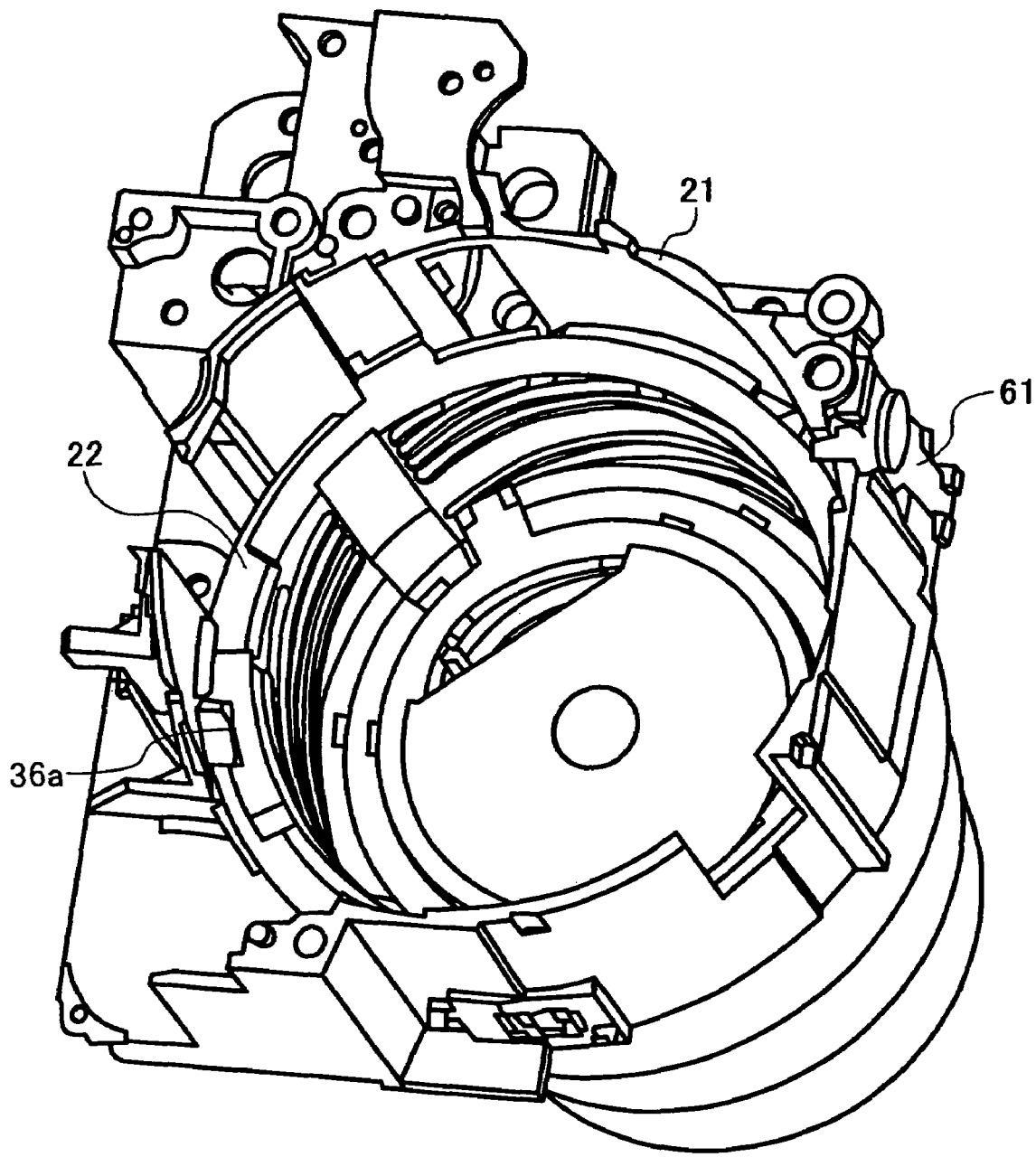
FIG. 6 is a perspective view of the structure of the portion of the lens barrel in the photographing state with the lens groups protruded, as viewed from the side of the image forming plane.

The lens barrier 62 shown in FIG. 3 to FIG. 5 covers the first lens group 11 on the object side in the stored state, thereby protecting the lens groups from contamination or damages. The lens barrier 62 is moved in the back and forth directions, orthogonally to the photographing optical axis, by the barrier drive system (barrier driving unit) 63. FIG. 3 and FIG. 4 show a state in which the lens barrier 62 is closed, and FIG. 5 shows a state in which the lens barrier 62 is almost opened. The barrier drive system 63 drives the lens barrier 62 between the closed position (FIG. 3, FIG. 4) and the opened position (the position farther from the photographing optical axis as shown in FIG. 5) through the operation of a barrier operating element (a barrier lever, a barrier operating element 301 in FIG. 17A). The barrier drive system 63 has a function to bias and deviate the lens barrier 62 in a direction for closing the lens barrier 62 (closing direction) at the closed position and in a direction for opening the lens barrier 62 (opening direction) at the opened position.

Therefore, when operating the lens barrier 62 from the closed state toward the opening direction, the lens barrier 62 moves to the opened state semi-automatically when the lens barrier 62 passes a predetermined position. Also, when an attempt is made to close the lens barrier 62 from the opened state, the lens barrier 62 moves to the closed state semi-automatically when the lens barrier 62 passes a predetermined position (the position is not necessarily required to be the same as the predetermined position in the opened state. Rather, a certain degree of hysteresis characteristics may preferably provide a smooth operation).

The barrier control member 61 is provided on a side of the fixed frame 21 in the direction of opening the lens barrier 62 so as to be capable of sliding in the direction along the photographing optical axis, and is biased toward the object by, for example but not limited to, the spring or a flexible material or an electromagnetic device, as needed. In the stored state, the engaging portion (control portion) of the barrier control member 61, which is formed into a bent shape, engages with the base end surfaces of the first rotary cylinder 22 and the first liner 23, and is deviated toward the image surface against the biasing force, and hence, is not in contact with the lens barrier 62 (second state). In the photographing state, the lens barrier 62 is completely away from the respective lens groups and the retaining frames thereof. In this state, engagement of the engaging portion of the barrier control member 61 is released, and hence the barrier control member 61 is deviated toward the object by the biasing force, and then, a barrier intercepting portion at the distal end protrudes into a passage of the lens barrier 62 (first state), thus preventing the lens barrier 62 to move to the closed state.

When an attempt is made to change the lens barrier 62 to the closed state from the opened state, and the lens barrier 62 is rapidly operated, the lens barrier 62 may hit against the lens barrel. However, since the barrier intercepting portion at the distal end of the barrier control member 61 crosses the passage of the lens barrier 62, the lens barrier 62 is prevented from proceeding into the lens barrel. When the respective lens groups are stored and the stored state is established, the base end surfaces of the first rotary cylinder 22 and the first liner 23 engage with the engaging portion of the barrier control member 61, which is formed into a bent shape, to deviate the engaging portion toward the image surface against the biasing force. Therefore, the barrier control member 61 moves along the optical axis towards the image side, allowing the lens barrier 62 to move to the closed state. Thus, the lens barrier 62 can move to the front portion of the lens barrel, and hence the lens barrier 62 is correctly set to the closed position. In this manner, an interference between the lens barrier 62 and the lens cylinder portions of the lens groups can be effectively prevented.

Thus, based on the above embodiments, a lens barrel having the following characteristics can be manufactured: 1) a barrier control member is shifted to the second state through being pushed by a moving portion of the lens barrel when the lens groups are stored, and the barrier control member is shifted to the first state through being released from contact with the moving portion when the lens groups shift to the photographing state; 2) the lens barrel includes an evacuation lens frame, all the lens groups are aligned coaxially on an identical optical axis in the photographing state, while said evacuation lens frame evacuates at least one of the lens groups to a position out of an optical axis of other lens group and outside the lens barrel in the collapsed state, and a lens cylinder of the lens barrel which moves nearest to an image forming plane, or a member which moves integrally with the lens cylinder, pushes the barrier control member as the moving portion when the lens barrel is stored; 3) the barrier control member is biased toward a direction of shifting the barrier control member from the second state to the first state.

Further, based on the above embodiments, a lens barrel having the following characteristics can be manufactured: 1) when the lens barrel shifts from the photographing state to the stored state, the lens barrel is collapsed nearer to an image forming plane than the back surface of the lens barrier, and after the lens barrier covers the front side of the lens of the lens groups nearest to the object, the lens barrel is protruded again to contact with the lens barrier; 2) the front surface of the lens barrel includes an elastic member; 3) the elastic member is formed integrally with a component arranged at foreground of the lens barrel; 4) the optical system apparatus further includes a draw-out position detector configured to detect a position at which the lens barrel is drawn-out toward the object, and the lens barrel is stopped when the front surface of the lens barrel contacts with the back surface of the lens barrier based on a signal outputted from the draw-out position detector; 5) when the lens barrel shifts from the stored state to the photographing state, the lens barrel is collapsed toward the image forming plane, and the lens barrel is drawn-out toward the object after the lens barrier is evacuated out of the operation area of the lens barrel; 6) the optical system apparatus further includes a barrier position detector for detecting a position of the lens barrier, and when the lens barrier starts to enter into the operation space of the lens barrel, the lens barrel is collapsed nearer to the image forming plane than the back surface of the lens barrier based on a signal output from the barrier position detector; 7) the optical system apparatus further includes a contact detector provided in a vicinity of the back surface of the lens barrier for detecting the contact of the front surface of the lens barrel with the back surface of the lens barrier.

Second Embodiment

Next, a second embodiment of the present invention, in which a camera is constructed by employing the optical system apparatus including the lens barrel according to the first embodiment of the present invention as a photographing optical system, will be explained in detail with reference to FIGS. 17A and 17B, and to FIG. 20.

Figure 17A:
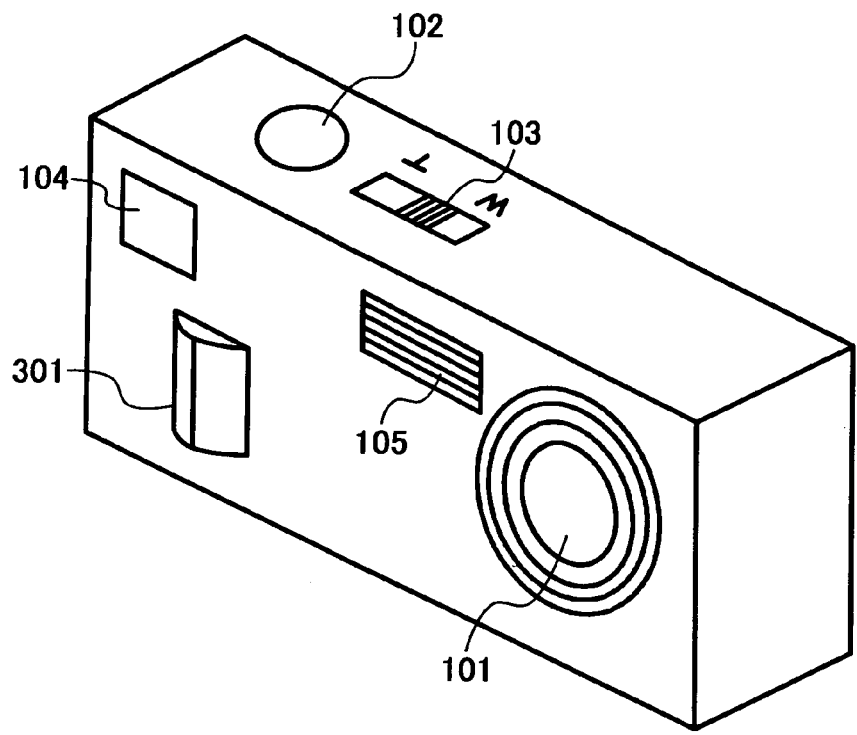
FIGS. 17A and 17B are perspective views showing an exterior appearance and a structure of a camera according to a second embodiment of the present invention as viewed from the object side.
Figure 17B:
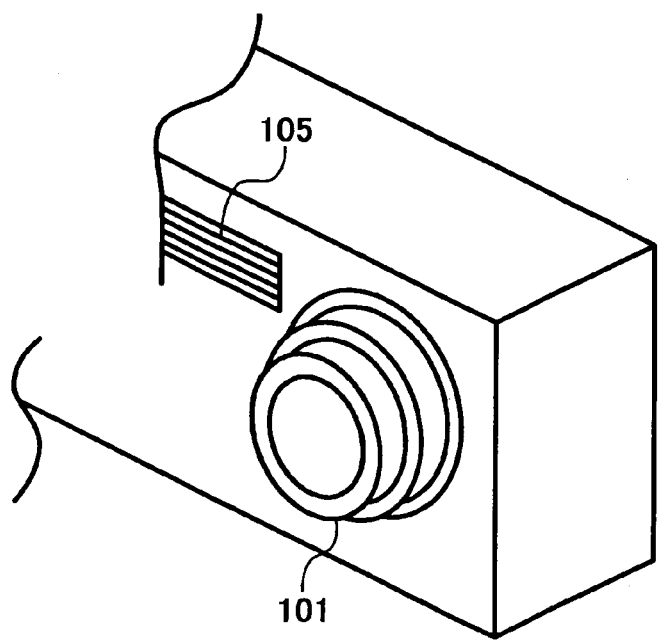
Figure 18:
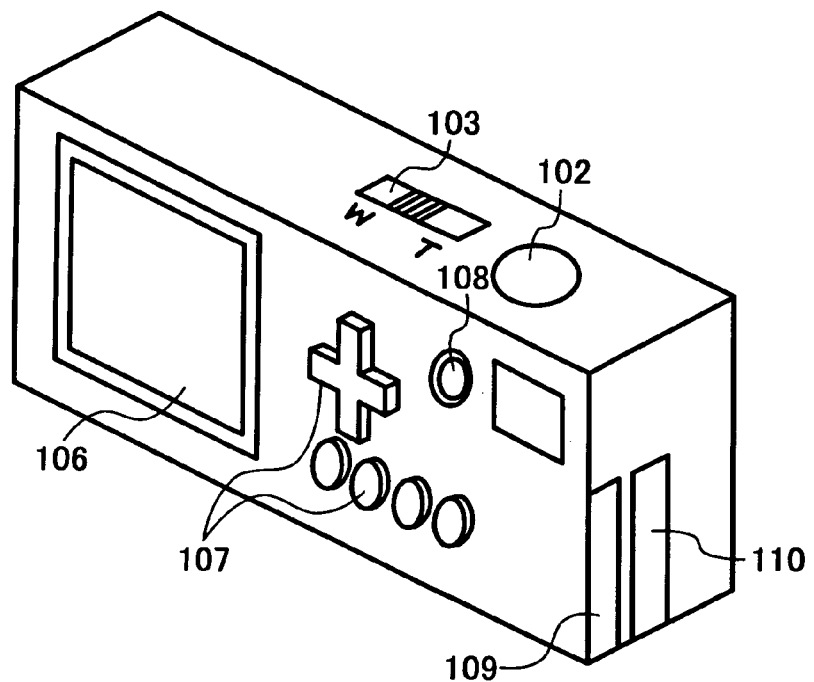
FIG. 18 is a perspective view schematically showing the exterior appearance and structure of the camera of FIGS. 17A and 17B as viewed from the user's side.
Figure 19:
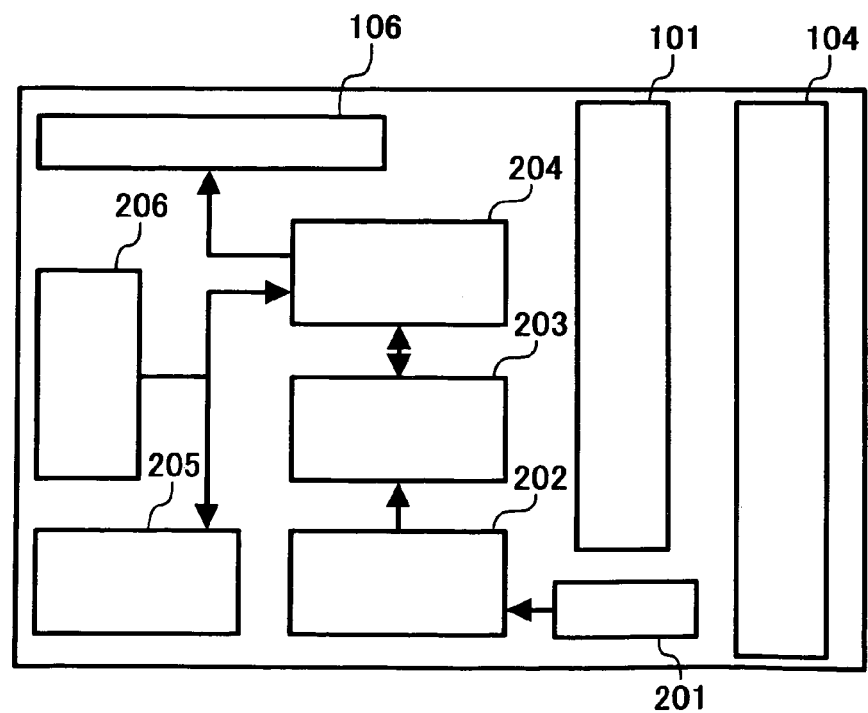
FIG. 19 is a block diagram schematically showing a functional structure of the camera of FIGS. 17A and 17B.

FIGS. 17A and 17B are perspective views showing an exterior appearance and structure of the camera according to the second embodiment of the present invention as viewed from the object side, that is, from the front side which corresponds to the side of the photographing object. FIG. 17A shows a state in which a photographing lens is collapsed and stored in a body of the camera, and FIG. 17B shows a state in which the photographing lens is protruded from the camera body. FIG. 18 is a perspective view schematically showing the exterior appearance and structure of the camera as viewed from the photographer's side, that is, the back side of the camera. FIG. 19 is a block diagram schematically showing a functional structure of the camera.

Although the camera is described here, the portable information terminal apparatus such as a so-called PDA (Personal Data Assistant) or a mobile phone, having a camera function integrated therein are in the market recently. Many of such portable information terminal apparatus have the function and the structure substantially identical to the function and the structure of the camera, although the appearance is slightly different, and hence the optical system apparatus including the lens barrel according to the present embodiment of the present invention may be employed in such mobile information terminal devices.

As shown in FIGS. 17A, 17B and FIG. 18, the camera includes a photographing lens 101, a shutter button 102, a zoom lever 103, a finder 104, a strobe light 105, a liquid crystal monitor 106, operating buttons 107, a power switch 108, a memory card slot 109, a communication card slot 110, and the barrier operating element 301. Furthermore, as shown in FIG. 19, the camera also includes a light-receiving element 201, a signal processing unit 202, an image processing unit 203, a central processing unit (CPU) 204, a semiconductor memory 205, and a communication card 206 or the like.

The camera includes the photographing lens 101 and the light receiving element 201 serving as an area sensor such as the CCD (Charge Coupled Device) image pickup element or the like, so that the light receiving element 201 reads an image of an object to be photographed, that is, of a photographing object, formed by the image pickup lens 101 as the photographing optical system. As the photographing lens 101, the optical system apparatus including the lens barrel according to the present invention as described in the first embodiment is employed. More specifically, lenses as optical elements constructing the lens barrel are used to structure the optical system apparatus. The lens barrel has mechanisms of retaining the respective lenses such that the lens groups can be moved and operated at least on the lens group basis. The photographing lens 101 to be integrated in the camera is generally integrated in the form of this optical system apparatus.

An output from the light receiving element 201 is processed by the signal processing unit 202 which is controlled by the central processing unit 204, and is converted into digital image information. The image information digitized by the signal processing unit 202 is subjected to a predetermined image processing in the image processing unit 203 which is also controlled by the central processing unit 204, and then stored in the semiconductor memory 205 such as a non-volatile memory. According to an embodiment of the present invention, the semiconductor memory 205 is a memory card inserted in the memory card slot 109. According to another embodiment of the present invention, the semiconductor memory 205 is a semiconductor memory integrated in the camera body. The liquid crystal monitor 106 is capable of displaying an image subjected to photographing and also is capable of displaying the image stored in the semiconductor memory 205. It is possible to transmit the image stored in the semiconductor memory 205 to the outside of the camera via the communication card 206 or the like inserted in the communication card slot 110.

The photographing lens 101 is embedded within the camera body in the collapsed state and the lens barrier 62 is closed as shown in FIG. 17A when the camera is transported. When the user operates the barrier operating element 301 to open the lens barrier 62, the power is turned on. Thereby, the lens barrel is extended and protruded from the camera body as shown in FIG. 17B, so that the photographing state is established. At this time, within the lens barrel of the photographing lens 101, the respective groups of the optical systems constructing the zoom lens unit are arranged, for example, at the short focal length wide angle position. When the zoom lever 103 is operated, the arrangement of the respective groups in the optical system is changed, so that zooming can be varied to the telephoto position.

In an embodiment of the present invention, the optical system of the finder 104 is configured such that the zooming is varied in association with the change of the angle of field of the photographing lens 101.

In many cases, focusing is achieved by a half-pressing operation of the shutter button 102. The focusing with the zoom lens unit according to the first embodiment of the present invention is, for example but not limited to, achieved mainly by moving the fourth lens group 14. When the shutter button 102 is further pressed to the completely pressed state, the photographing is achieved, and subsequently the processing as described above is performed.

In order to display the image stored in the semiconductor memory 205 on the liquid crystal monitor 106 or transmit the same to the outside of the camera via the communication card 206 or the like, the operating buttons 107 are operated in a predetermined manner. The semiconductor memory 205 and the communication card 206 or the like are used by being inserted in, for example, a specific or multi-purpose slot such as the memory card slot 109 and the communication card slot 110.

When the photographing lens 101 is in the collapsed state, the third lens group 13 is evacuated from the optical axis and is stored in a line with the first lens group 11 and the second lens group 12 in a juxtaposed manner. Therefore, a further reduction in the thickness of the camera is achieved.

Third Embodiment

Next, a third embodiment of the present invention, in which a camera is constructed by employing the optical system apparatus including the lens barrel according to the first embodiment of the present invention will be explained in detail with reference to FIG. 20 to FIG. 22.

Figure 20:
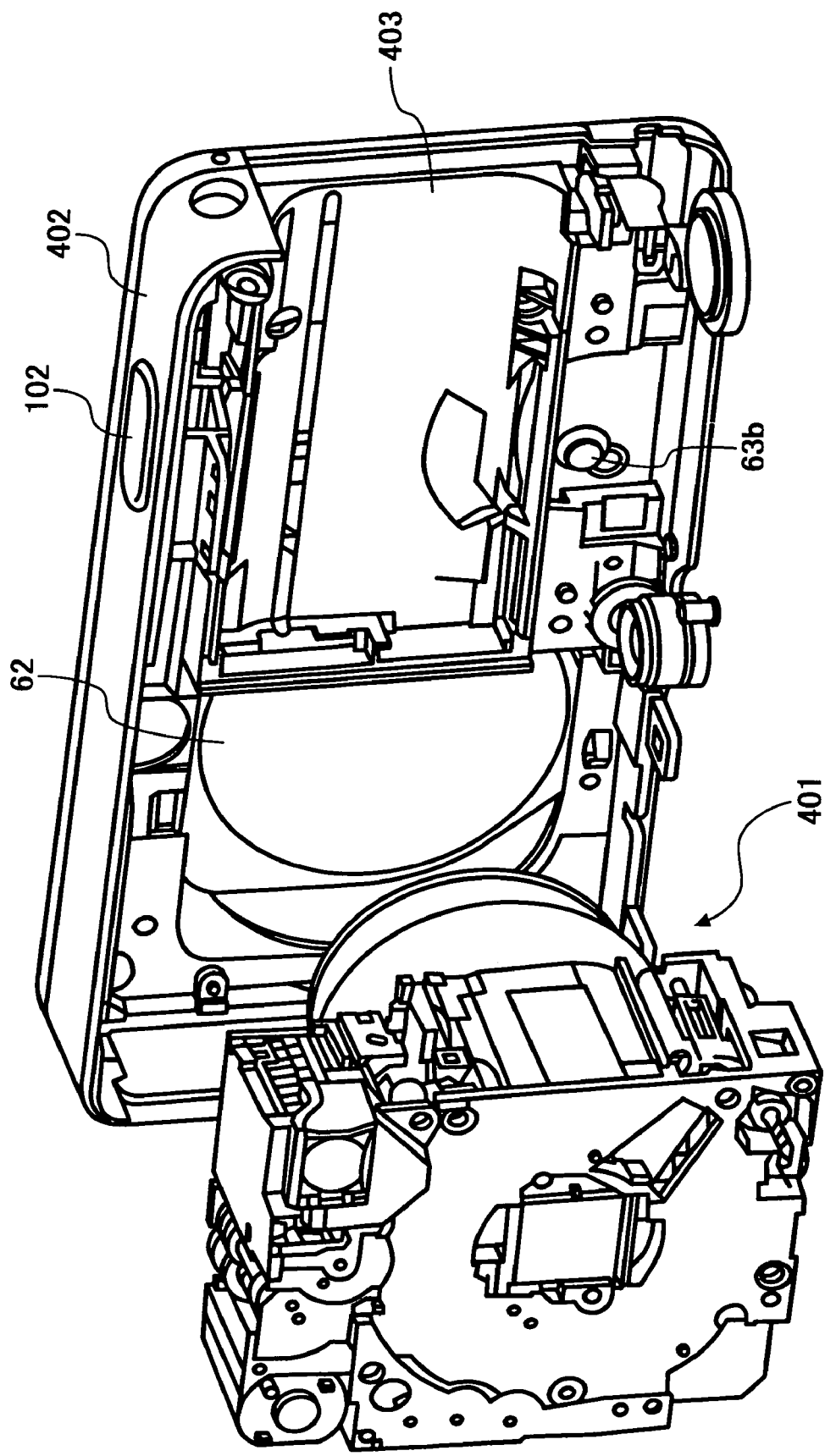
FIG. 20 is an exploded perspective view of a structure of a lens barrel portion in a state in which the lens groups of a camera according to a third embodiment of the present invention are partly protruded and a structure of a front cover of the camera in a state in which a lens barrier is halfway closed, as viewed from the side of the image forming plane.

FIG. 20 is an exploded perspective view of a structure of a lens barrel in a state in which the lens groups of the camera according to the third embodiment of the present invention are partly protruded and a structure of a front cover of the camera in a state in which a lens barrier is halfway closed, as viewed from the side of the image forming plane (from a back side). FIG. 21 is an exploded perspective view of the structures in the states shown in FIG. 20 as viewed from the object side (from a front side). FIG. 22 is a back view of the structure of the front cover of the camera from which an inner cover is removed, as viewed from the side of the image forming plane. In FIGS. 20 to 22, same reference numbers are attached to the portions corresponding to respective portions shown in FIGS. 1 to 19.

Meanwhile, although a description is provided here in relation to the camera, it is to be noted that the optical system apparatus including the lens barrel according to an embodiment of the present invention is applicable to a portable information terminal apparatus such as a so-called PDA (Personal Data Assistant) and a portable cellular phone, etc., in which a camera function is incorporated. Such portable information terminal apparatus have appearances slightly different from a camera, but they include a function and a configuration which are substantially identical to the camera. Accordingly, it is possible that the optical system apparatus including the lens barrel according to an embodiment of the present invention is employed in such a portable information terminal apparatus.

Figure 21:
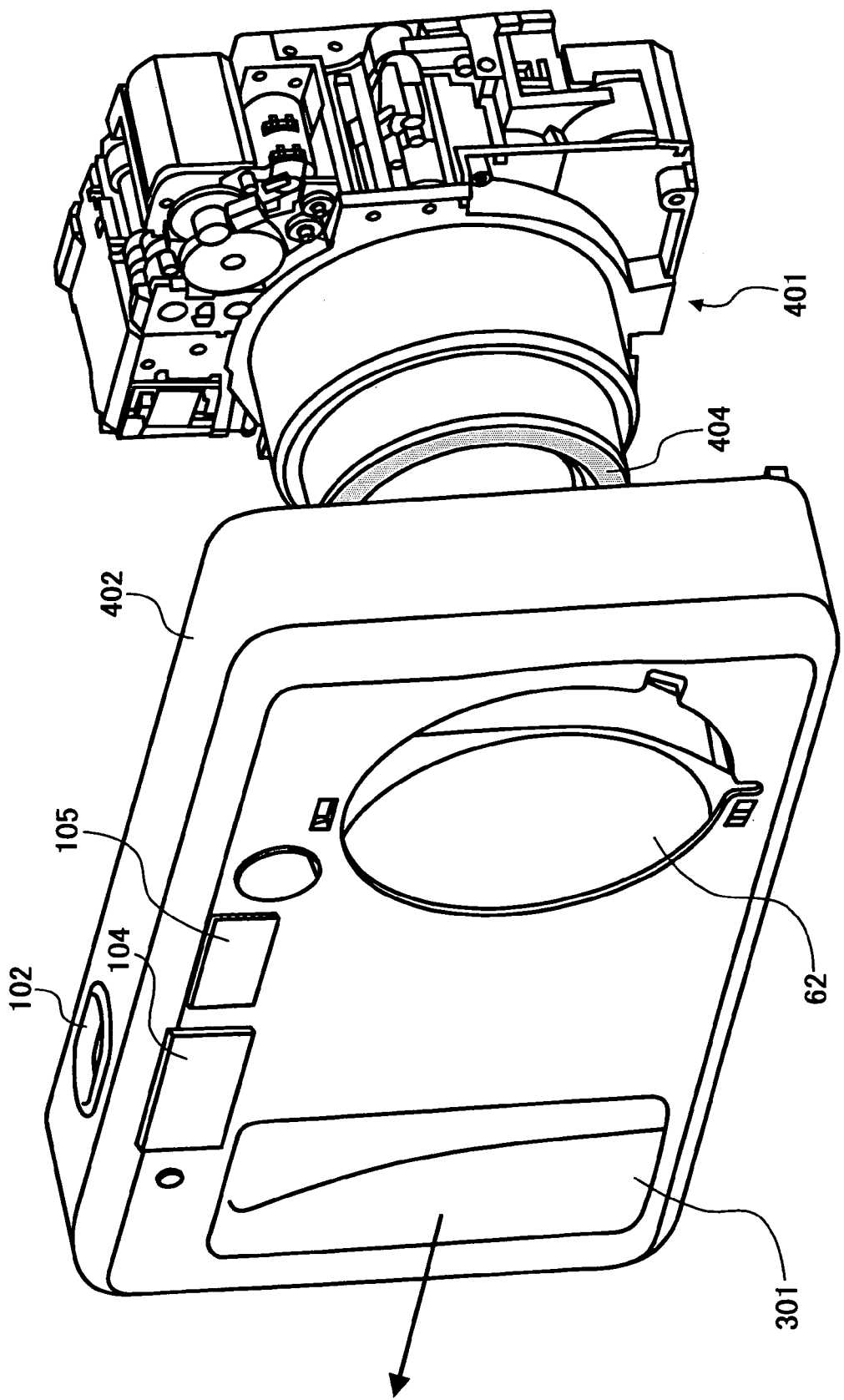
FIG. 21 is an exploded perspective view of the structures in the states shown in FIG. 20 as viewed from the object side.
Figure 22:
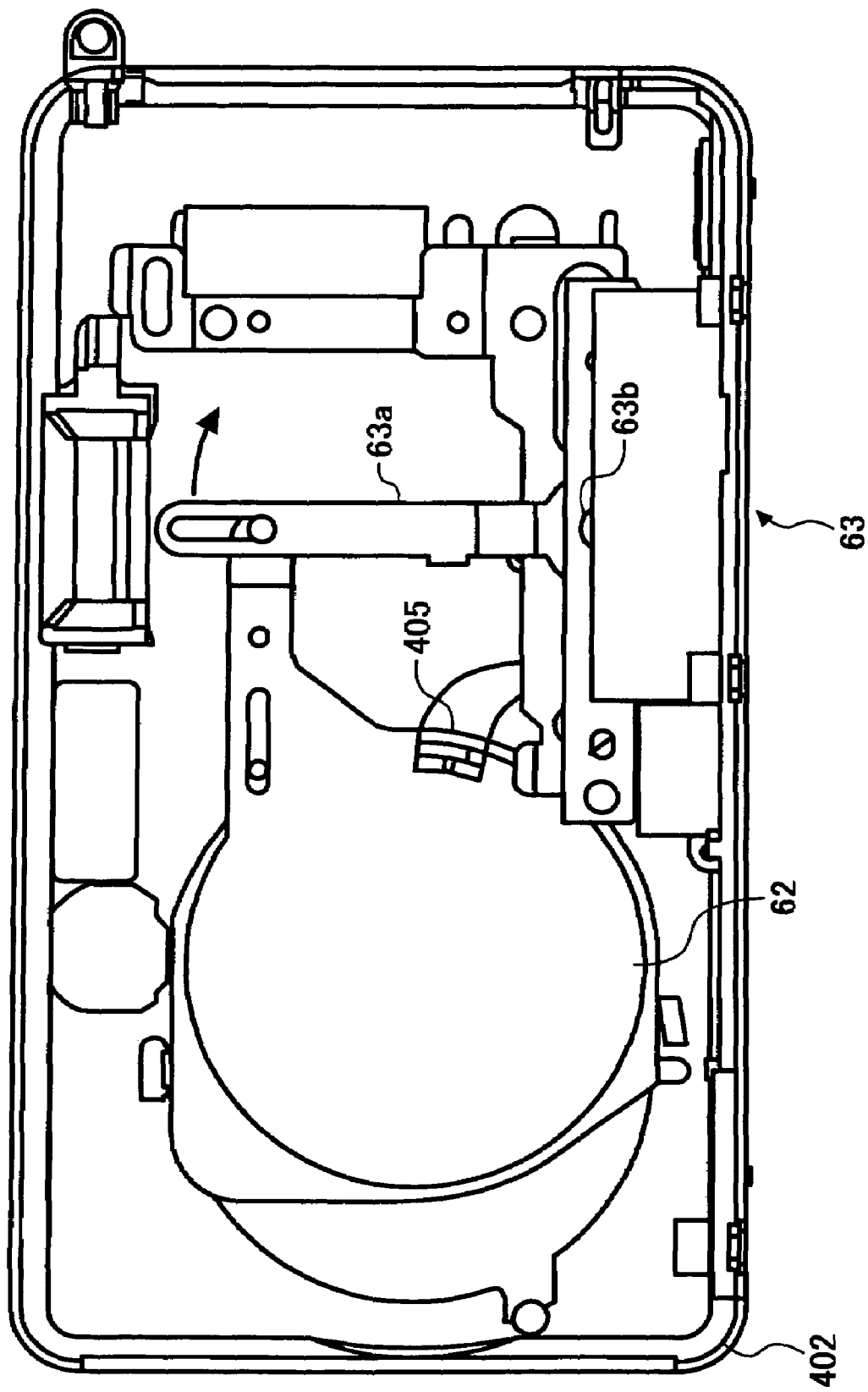
FIG. 22 is a back view of the structure of the front cover of the camera from which an inner cover is removed, as viewed from the side of the image forming plane.

As shown in FIGS. 20 to 22, the camera according to the third embodiment includes the shutter button 102, the finder 104, the strobe light 105, and the barrier operating element 301, which are attached to a side of a front cover 402, and a lens barrel portion 401. In addition, although they are not shown, the camera also includes the liquid crystal monitor, the operating buttons, the memory card slot, the communication card slot, the light-receiving element, the signal processing unit, the image processing unit, the central processing unit (CPU), the semiconductor memory and the communication card or the like, as with the camera shown in FIGS. 18 and 19.

Although not shown, the camera includes a draw-out position detector which detects a position at which the lens barrel portion 401 is drawn-out toward the object side. Thus, it is possible to stop drawing out the lens barrel according to a signal outputted from the draw-out position detector. For example, a photo-interrupter or a photo-reflector (sensor) can be used for the draw-out position detector. According to one embodiment, a configuration is employed where the draw-out position of the lens barrel is detected by counting a pulse outputted from the photo-interrupter according to the drawing out of the lens barrel from a reference position (between the stored position and the short focal length wide angle position) of the lens barrel. In another embodiment, a focusing lens position detector which detects positions of the first lens group and the second lens group on the optical axis by using a resistance band and a brush which slidably contacts the resistance band, and outputs focusing lens position data including a voltage proportional to a position of a focusing lens, is utilized, which is for example, disclosed in Japanese patent registration No. 3208492.

The front cover 402 is attached with the lens barrier 62 which has been explained above by referring to FIGS. 3 to 5. For example, a metal material is used for the front cover 402 and the lens barrier 62. The barrier drive system (barrier driving unit) 63 includes the barrier operating element 301, an internal lever 63a as a link mechanism for linking the barrier operating element 301 and the lens barrier 62, and a shaft 63b as a rotational supporting point of the internal lever 63a. Through the operation of the barrier operating element 301, the barrier drive system 63 drives the lens barrier 62 between the closed position as shown in FIGS. 3 and 4 and the opened position (the position farther from the photographing optical axis than the position shown in FIG. 5). The barrier drive system 63 is accommodated in a space (operation space) formed between the front cover 402 and an inner cover 403.

An elastic member 404 is attached to a front surface of the lens barrel as shown in FIG. 21. The elastic member 404 is, for example but not limited to, formed integrally with a component arranged at foreground of the lens barrel. Also, the elastic member 404 can be added to the front surface of the lens barrel after the lens barrel has been formed. The elastic member 404 includes, for example but not limited to, a silicon rubber, and is mixed with an electrically conductive material therein. Also, as shown in FIG. 22, a contact detector 405 is provided in the vicinity of a peripheral edge of a back surface of the lens barrier 62. The contact detector 405 detects that the front surface of the lens barrel is contacted with the lens barrier 62 by electric conduction caused when the elastic member 404, which fits with the front surface of the lens barrel and in which the electrically conductive material is mixed, contacts with the lens barrier 62.

Next, an operation of the camera structured as mentioned above when the barrier operating element 301 is operated will be described.

The camera is in the collapsed and stored state, in which the lens groups of the lens barrel portion 401 are collapsed and stored in a body of the camera, at the time when the camera is not used (when the lens barrel is collapsed), i.e., when the user transports the camera for example, and thus the lens barrier 62 is closed. When the user operates the barrier operating element 301 in a direction of an arrow shown in FIG. 21, the power is turned on and the lens barrel is slightly collapsed (retracted) toward the side of the image forming plane. Then, the internal lever 63a, which engages with the barrier operating element 301, is rotated in a direction of an arrow shown in FIG. 22 around the shaft 63b as the center of rotation, thereby opening the lens barrier 62. When the lens barrier 62 is completely opened and a barrier position detector, which is not shown, detects that the lens barrier 62 is opened completely, the lens barrel is drawn-out and is protruded from the front cover 402 of the camera. Accordingly, the state in which the photographing is possible is thereby established.

When the user operates the barrier operating element 301 in a direction opposite to the direction of the arrow shown in FIG. 21 and the barrier position detector detects that the lens barrier 62 has started to close, the lens barrel collapses. At this time, the lens barrel collapses into the body of the camera in such a manner that a leading end of the lens barrel is positioned nearer to the side of the image forming plane than the back surface of the lens barrier 62.

Thereafter, when the not shown barrier position detector detects that the lens barrier 62 has closed completely, the lens barrel is drawn-out again for a certain amount, and the elastic member 404, which is provided on the front surface of the lens barrel and in which the electrically conductive material is mixed, thereby contacts with a proximity of the back surface of the lens barrier 62. Thus, the contact detector 405 electrically conducts and detects that the front surface of the lens barrel contacts with the back surface of the lens barrier 62, and consequently the lens barrel is stopped after being drown-out by a predetermined amount (for example but not limited to, by an amount of elasticity of the elastic member 404). Here, since the camera includes the not shown draw-out position detector for detecting the position at which the lens barrel portion 401 is drawn-out toward the object side, it is possible to stop the drawing out operation of the lens barrel when the front surface of the lens barrel contacts with the back surface of the lens barrier 62 even if there is a variation in assembling or the like of the lens barrel, based on the signal outputted from the draw-out position detector. Therefore, it is possible to reduce a difference in the position at which the front surface of the lens barrel contacts with the back surface of the lens barrier 62.

As described in the foregoing, according to the third embodiment of the present invention, the front surface of the lens barrel contacts with the back surface of the lens barrier 62 and the lens barrier 62 is fixed by friction of the elastic member 404 when the lens barrel is stored. Accordingly, although a space for making the opening and closing operations of the lens barrier 62 smooth is provided between the front cover 402 and the lens barrier 62, the rattling movement and the abnormal sound will not be generated even when the user shakes the camera in a state where the photographing is not carried out, i.e., the collapsed state (for example, at the time that the camera is carried and thus is not used). Since the easily deformable elastic member 404 is used at the front surface, which contacts with the lens barrier 62, of the lens barrel, it is possible to prevent the rattling movement of the lens barrier irrespective of the material used for the front cover 402 and the lens barrier 62, and also to alleviate an impact at the time when the lens barrel portion 401 and the lens barrier 62 contact with each other, and further to apply a biasing force against the lens barrier 62.

Moreover, the contact detector 405 is provided in the vicinity of the peripheral edge of the back surface of the lens barrier 62. The contact detector 405 detects that the front surface of the lens barrel is contacted with the lens barrier 62, through the electric conduction due to the contact of the elastic member 404, which fits with the front surface of the lens barrel and in which the electrically conductive material is mixed, and the lens barrier 62. Consequently, it is possible to stop the movement of the lens barrel at the moment when the front surface of the lens barrel and the back surface of the lens barrier 62 contact to each other or at the time when the front surface of the lens barrel is pressed against the lens barrier 62 by the predetermined amount, and thereby, to alleviate the impact of the contact. Thus, the central processing unit 204 can be programmed to control the predetermined amount of force with which the front surface of the lens barrel is pressed against the lens barrier 62.

In addition, since the camera includes the draw-out position detector, it is possible to reduce (control) the difference in position at which the front surface of the lens barrel contacts the back surface of the lens barrier 62, caused by the variation in the assembling or the like of the lens barrel. Also, because the elastic member 404 is (integrally) formed with the foreground component of the lens barrel, the assembling of the camera including such a lens barrel is easy, and hence, it is possible to reduce the manufacturing cost.

In addition, according to the third embodiment of the present invention, the lens barrel is collapsed (retracted) toward the side of the image forming plane by the predetermined amount when the lens barrel shifts from the state where the photographing is not carried out to the photographing state. Accordingly, it is possible to make the opening operation of the lens barrier 62 smooth. On the other hand, when the lens barrier 62 starts the closing operation and the lens barrel shifts from the photographing state to the non-photographing state, the not shown barrier position detector detects the closing operation of the lens barrier 62. Since, at this time, the front surface of the lens barrel is retired closer to the side of the image forming plane than the back surface of the lens barrier 62, it is possible to make the closing operation of the lens barrier 62 smooth.

Moreover, the metal material is used for the front cover 402 and the lens barrier 62. Therefore, it is possible to exhibit a feeling of high-graded camera to the user.

The above-mentioned third embodiment has been described with the example wherein other embodiments of the present invention are applied to the digital still camera, but it is to be understood that the present invention is not limited thereto. The embodiments of the present invention are also applicable to, for example but not limited to, a video camera, a silver salt camera using a silver salt film, binoculars which include the lens barrier, or other devices known by the one or ordinary skill in the art to use an optical system.

Also, the technologies described in each of the aforementioned embodiments can be utilized mutually unless any contradictions or problems in object or the structure or the like of the embodiments occur.

Although the present invention has been described in terms of exemplary embodiments, it is not limited thereto. Rather, the appended claims should be construed broadly to include other variants and embodiments of the invention which may be made by those skilled in the field of this art without departing from the scope and range of equivalents of the invention.

The invention claimed is:

1. An optical system apparatus, comprising:
a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed, and wherein the lens barrel includes a retractable lens configured to be aligned coaxially with said plurality of lenses on said optical axis in the photographing position, wherein, in the collapsed position, said retractable lens is configured to retract to a position out of said optical axis through a side of the lens barrel;
a lens barrier configured to cover at least a front side of a lens of the plurality of lenses, the lens being closest to the object to be photographed when the lens barrel is at the stored position;
a barrier driving unit configured to move the lens barrier between a closed position and an opened position for retracting the lens barrier out of an operation space of the lens barrel; and
a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier.

2. The optical system apparatus according to claim 1, wherein the barrier control member is configured to move between a first position that corresponds to the opened position of the lens barrier, and a second position that corresponds to the closed position of the lens barrier,
the lens barrel is configured to engage the control portion of the barrier control member to move the barrier control member to the second position; and
the barrier control member is configured to move to the first position due to the bias when the plurality of lenses move to the photographing position.

3. The optical system apparatus according to claim 1, wherein the lens barrel comprises:
a first movable cylinder configured to move closest to an image forming plane and configured to contact said control portion and to push the barrier control member along said optical axis when the lens barrel is stored.

4. The optical system apparatus according to claim 1, wherein the barrier control member is configured to be biased toward said object to be photographed.

5. The optical system apparatus according to claim 1, further comprising: at least one of a spring, a flexible material, and an electromagnetic device, each configured to provide said bias.

6. The optical system apparatus according to claim 1, further comprising:
a sensor configured to detect first and second positions of said barrier control member.

7. An optical system apparatus, comprising:
a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed;
a lens barrier configured to move relative to a front cover of the optical system apparatus and configured to cover at least a front side of a lens of the plurality of lenses that is closest to the object when the lens barrel is at the stored position; and
a barrier driving unit configured to move the lens barrier relative to the front cover, between a closed position and an opened position for retracting the lens barrier out of an operation space of the lens barrel,
wherein at least a portion of the plurality of lenses is extended toward the object in the photographing position, and
wherein a front surface of the lens barrel contacts a back surface of the lens barrier in the stored position of the lens barrel such that said lens barrier is prevented from moving along said optical axis.

8. The optical system apparatus according to claim 7, wherein when the lens barrel moves from the photographing position to the stored position, the lens barrel is configured to be collapsed closer to an image forming plane than the back surface of the lens barrier, and
after the lens barrier covers the front side of the lens, the lens barrel is extended again to contact the back surface of the lens barrier.

9. The optical system apparatus according to claim 7, wherein the front surface of the lens barrel comprises an elastic member.

10. The optical system apparatus according to claim 9, wherein the elastic member is formed integrally with a component arranged at the foreground of the lens barrel.

11. The optical system apparatus according to claim 7, further comprising:
a drawn-out position detector configured to detect a position at which the lens barrel is drawn-out toward the object to be photographed,
wherein the lens barrel is configured to be stopped when the front surface of the lens barrel contacts with the back surface of the lens barrier based on a signal output from the drawn-out position detector.

12. The optical system apparatus according to claim 7, wherein the lens barrel is configured to move from the stored position to the photographing position toward the object to be photographed after the lens barrier is retracted out of the operation space of the lens barrel.

13. The optical system apparatus according to claim 7, further comprising:
a barrier position detector configured to detect a position of the lens barrier, wherein when the lens barrier starts to enter into the operation space of the lens barrel, the lens barrel is collapsed closer to an image forming plane than the back surface of the lens barrier based on a signal output from the barrier position detector.

14. The optical system apparatus according to claim 7, further comprising:
a contact detector provided near the back surface of the lens barrier, wherein the contact detector is configured to detect a contact of the front surface of the lens barrel with the back surface of the lens barrier.

15. A camera, comprising:
an optical system apparatus, including:
a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed, and wherein the lens barrel includes a retractable lens configured to be aligned coaxially with said plurality of lenses on said optical axis in the photographing position, wherein, in the collapsed position, said retractable lens is configured to retract to a position out of said optical axis through a side of the lens barrel;
a lens barrier configured to cover at least a front side of a lens of the plurality of lenses, the lens being closest to the object to be photographed when the lens barrel is at the stored position;
a barrier driving unit configured to move the lens barrier between a closed position and an opened position for retracting the lens barrier out of an operation space of the lens barrel; and
a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier.

16. The camera according to claim 15, further comprising:
a front cover configured to cover the lens barrier and a front of the camera, said front cover including a metal material.

17. The camera according to claim 15, wherein the lens barrel comprises:
a first movable cylinder configured to move closest to an image forming plane and configured to contact said control portion and to push the barrier control member along said optical axis when the lens barrel is stored.

18. The camera according to claim 15, further comprising:
at least one of a spring, a flexible material, and an electromagnetic device, each configured to provide said bias.

19. A portable information terminal apparatus, comprising:
a camera portion configured to transform optical information into digital information; and
an optical system apparatus, including
a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed, and wherein the lens barrel includes a retractable lens configured to be aligned coaxially with said plurality of lenses on said optical axis in the photographing position, wherein, in the collapsed position, said retractable lens is configured to retract to a position out of said optical axis through a side of the lens barrel;
a lens barrier configured to cover at least a front side of a lens of the plurality of lenses, the lens being closest to the object to be photographed when the lens barrel is at the stored position;
a barrier driving unit configured to move the lens barrier between a closed position and an opened position for retracting the lens barrier out of an operation space of the lens barrel; and
a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier.

20. The portable apparatus according to claim 19, wherein the lens barrel comprises:
a first movable cylinder configured to move closest to an image forming plane and configured to contact said control portion and to push the barrier control member along said optical axis when the lens barrel is stored.

21. An optical system apparatus, comprising:
a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed;
a lens barrier configured to cover at least a front side of a lens of the plurality of lenses, the lens being closest to the object to be photographed when the lens barrel is at the stored position;
a barrier driving unit configured to move the lens barrier between a closed position and an opened position for retracting the lens barrier out of an operation space of the lens barrel; and
a barrier control member being biased and movable along a direction parallel to the optical axis, the barrier control member protruding to cross a path of the lens barrier to prevent the lens barrier from moving to the closed position from the opened position when said lens barrel is in the photographing position, and the barrier control member including a control portion configured to contact the lens barrel when the lens barrel reaches the stored position such that the control portion retracts the barrier control member from the path of the lens barrier.

22. The optical system apparatus according to claim 21, wherein the lens barrel comprises a retractable lens configured to be aligned coaxially with said plurality of lenses on said optical axis in the photographing position, wherein, in the collapsed position, said retractable lens is configured to retract to a position out of said optical axis through a side of the lens barrel.

23. A camera, comprising:
- an optical system apparatus, including:
- a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed;
- a lens barrier configured to cover at least a front side of a lens of the plurality of lenses, the lens being closest to the object to be photographed when the lens barrel is at the stored position;
- a barrier driving unit configured to move the lens barrier between a closed position and an opened position for retracting the lens barrier out of an operation space of the lens barrel;
- a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier; and
- a front cover configured to cover the lens barrel and a front of the camera, said front cover including a metal material.

24. A camera, comprising:
- an optical system apparatus, including:
- a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed, and wherein the lens barrel includes a retractable lens configured to be aligned coaxially with said plurality of lenses on said optical axis in the photographing position, wherein, in the collapsed position, said retractable lens is configured to retract to a position out of said optical axis through a side of the lens barrel, and a first movable cylinder configured to move closest to an image forming plane;
- a lens barrier configured to cover at least a front side of a lens of the plurality of lenses, the lens being closest to the object to be photographed when the lens barrel is at the stored position;
- a barrier driving unit configured to move the lens barrier between a closed position and an opened position for retracting the lens barrier out of an operation space of the lens barrel; and
- a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier wherein the first movable cylinder is configured to contact said control portion and to push the barrier control member along said optical axis when the lens barrel is stored.

25. A portable information terminal apparatus, comprising:
- a camera portion configured to transform optical information into digital information; and
- an optical system apparatus, including:
- a lens barrel including a plurality of lenses, wherein the lens barrel is configured to be moved between (1) a stored position in which the plurality of lenses are collapsed, and (2) a photographing position in which the plurality of lenses are aligned along an optical axis of said apparatus and extended towards an object to be photographed, and wherein the lens barrel includes a retractable lens configured to be aligned coaxially with said plurality of lenses on said optical axis in the photographing position, wherein, in the collapsed position, said retractable lens is configured to retract to a position out of said optical axis through a side of the lens barrel, and a first movable cylinder configured to move closest to an image forming plane;
- a lens barrier configured to cover at least a front side of a lens of the plurality of lenses, the lens being closest to the object to be photographed when the lens barrel is at the stored position;
- a barrier driving unit configured to move the lens barrier between a closed position and an opened position for retracting the lens barrier out of an operation space of the lens barrel; and
- a barrier control member configured to prevent the lens barrier from moving to the closed position from the opened position when said lens barrel is in the photographing position, said barrier control member being movable along a direction parallel to said optical axis, said barrier control member being biased, and said barrier control member including a control portion configured to contact the lens barrel when the lens barrel reaches the stored position such that the control portion retracts the barrier control member from a path of the lens barrier wherein the first movable cylinder is configured to contact said control portion and to push the barrier control member along said optical axis when the lens barrel is stored.

* * * * *